United States Patent
Nomura et al.

(10) Patent No.: US 12,455,610 B2
(45) Date of Patent: Oct. 28, 2025

(54) COMPUTATION PROCESSING DEVICE

(71) Applicant: TOHOKU UNIVERSITY, Miyagi (JP)

(72) Inventors: Osamu Nomura, Miyagi (JP); Tetsuo Endoh, Miyagi (JP); Ko Yoshikawa, Miyagi (JP); Tao Li, Miyagi (JP)

(73) Assignee: Tohoku University, Miyagi (JP)

( * ) Notice: Subject to any disclaimer, the term of this patent is extended or adjusted under 35 U.S.C. 154(b) by 73 days.

(21) Appl. No.: 18/286,849

(22) PCT Filed: Apr. 13, 2022

(86) PCT No.: PCT/JP2022/017749
§ 371 (c)(1),
(2) Date: Oct. 13, 2023

(87) PCT Pub. No.: WO2022/230674
PCT Pub. Date: Nov. 3, 2022

(65) Prior Publication Data
US 2024/0192758 A1 Jun. 13, 2024

(30) Foreign Application Priority Data
Apr. 28, 2021 (JP) .................. 2021-076873

(51) Int. Cl.
G06F 1/32 (2019.01)
G06F 1/3287 (2019.01)

(52) U.S. Cl.
CPC ................ G06F 1/3287 (2013.01)

(58) Field of Classification Search
CPC .................................. G06F 1/3287
See application file for complete search history.

(56) References Cited

U.S. PATENT DOCUMENTS 10,078,620 B2  9/2018 Farabet et al.
2017/0300815 A1* 10/2017 Seo .................. G06N 3/063
2019/0363131 A1  11/2019 Torng et al.

FOREIGN PATENT DOCUMENTS

JP  2014-52801 A  3/2014
JP  2017-146703 A  8/2017
(Continued)

OTHER PUBLICATIONS

Samsung Semiconductor Global, "Meeting the developers of MRAM", retrieved from the internet at <https://semiconductor.samsung.com/news-events/tech-blog/meet-the-brains-behind-mram-next-great-leap-forward-in-memory-technology/>, 4 pages (Year: 2019).*

(Continued)

Primary Examiner — Stefan Stoynov
(74) Attorney, Agent, or Firm — Fox Rothschild LLP; Carol E. Thorstad-Forsyth

(57) ABSTRACT

A computation processing device includes: a memory unit that retains computation data for weighting computation, and at least a part of which is a non-volatile storage region; a computation circuit unit that performs computation processing including the weighting computation by using a part or all of the computation data input from the memory unit; and a power gate unit that blocks power supply to a part or all of memory cells other than memory cells storing a part or all of the computation data input to the computation circuit unit in the computation processing when performing the computation processing, in the non-volatile storage region.

18 Claims, 16 Drawing Sheets

(56) References Cited

FOREIGN PATENT DOCUMENTS

| | | |
|---|---|---|
| JP | 2018-120433 A | 8/2018 |
| JP | 2019-57053 A | 4/2019 |
| JP | 2019-139300 A | 8/2019 |
| WO | 2019/049842 A1 | 3/2019 |

OTHER PUBLICATIONS

Peemen et al.: "Memory-Centric Accelerator Design for Convolutional Neural Networks", 2013 IEEE 31st International Conference on Computer Design (ICCD), Asheville, NC, USA, 2013, pp. 13-19.
International Search Report dated Jul. 19, 2022 in PCT/JP2022/017749.

* cited by examiner

COMPUTATION PROCESSING DEVICE

CROSS-REFERENCE TO RELATED APPLICATIONS

This application is a § 371 national phase entry of International Patent Application No. PCT/JP2022/017749, filed on Apr. 13, 2022, which claims priority to and the benefit of Japanese Patent Application No. JP2021-076873 filed on Apr. 28, 2021, both of which are hereby incorporated herein by reference in their entireties.

TECHNICAL FIELD

The present invention relates to a computation processing device.

BACKGROUND ART

A computation processing device recognizing an image by using a convolutional neural network, that is, a neural network including a convolutional layer is known, and is expected to be applied to robot control, vehicle driving control, or the like. In the convolutional computation processing of the convolutional neural network such as image recognition, massive sum-of-product computation of weighting and adding data of an input layer or an intermediate layer by using weight data of a convolutional filter is required. The data used in such computation is retained in a memory, and is sequentially read out and sent to a computation circuit in the sum-of-product computation.

PTL 1 describes a computation processing device of a convolutional neural network in which different types of memories, for example, SRAM, a magnetoresistive memory (MRAM), a resistive memory (ReRAM), and the like are mixedly mounted on a semiconductor substrate to improve a memory access speed and to reduce power consumption.

PTL 2 describes a computation processing device configured to read out a plurality of data pieces of one channel (feature map) of an input layer or the like and weight data of a convolutional filter from a memory, in a convolutional neural network, and allow a plurality of sum-of-product computation units to calculate a plurality of data pieces of one channel of the next layer in parallel. NPL 1 describes a usage example of a memory optimized in accordance with a layer, in a convolutional neural network.

On the other hand, as a technology of suppressing power consumption, power gating of blocking power supply to a computation circuit such as a processor core and suppressing a current leakage is known.

CITATION LIST

Patent Literature

PTL 1: US2019/0363131
PTL 2: U.S. Pat. No. 10,078,620B

Non Patent Literature

NPL 1: M. Peemen, A. A. A. Setio, B. Mesman, and H. Corporaal, "Memory-centric accelerator design for Convolutional Neural Networks," in 2013 IEEE 31st ICCD, 2013, pp. 13-19.

SUMMARY OF INVENTION

Technical Problem

In the computation processing device of the convolutional neural network, as described above, massive sum-of-product computation is required in the convolutional computation processing, and thus, there is a problem of large power consumption. In particular, it is particularly important to suppress the power consumption in an end device such as a robot, vehicle, or a mobile terminal. Accordingly, in the computation processing device performing computation, such as a convolutional neural network, it is desirable to further reduce the power consumption.

The invention has been made in consideration of the circumstances described above, and an object thereof is to provide a computation processing device capable of further reducing power consumption.

Solution to Problem

In order to attain the object described above, a computation processing device of the invention, includes: a memory unit that retains computation data for weighting computation, and at least a part of which is a non-volatile storage region; a computation circuit unit that performs computation processing including the weighting computation by using a part or all of the computation data input from the memory unit; and a power gate unit that blocks power supply to a part or all of memory cells other than memory cells storing a part or all of the computation data input to the computation circuit unit in the computation processing when performing the computation processing, in the non-volatile storage region.

Advantageous Effects of Invention

According to the invention, the power supply to a part or all of the memory cells of the non-volatile storage region provided in the memory unit retaining the computation data, other than the memory cells storing a part or all of the computation data input to the computation circuit unit in the computation processing, is blocked when performing the computation processing, and thus, it is possible to further reduce the power consumption.

DESCRIPTION OF EMBODIMENTS

First Embodiment

Figure 1:
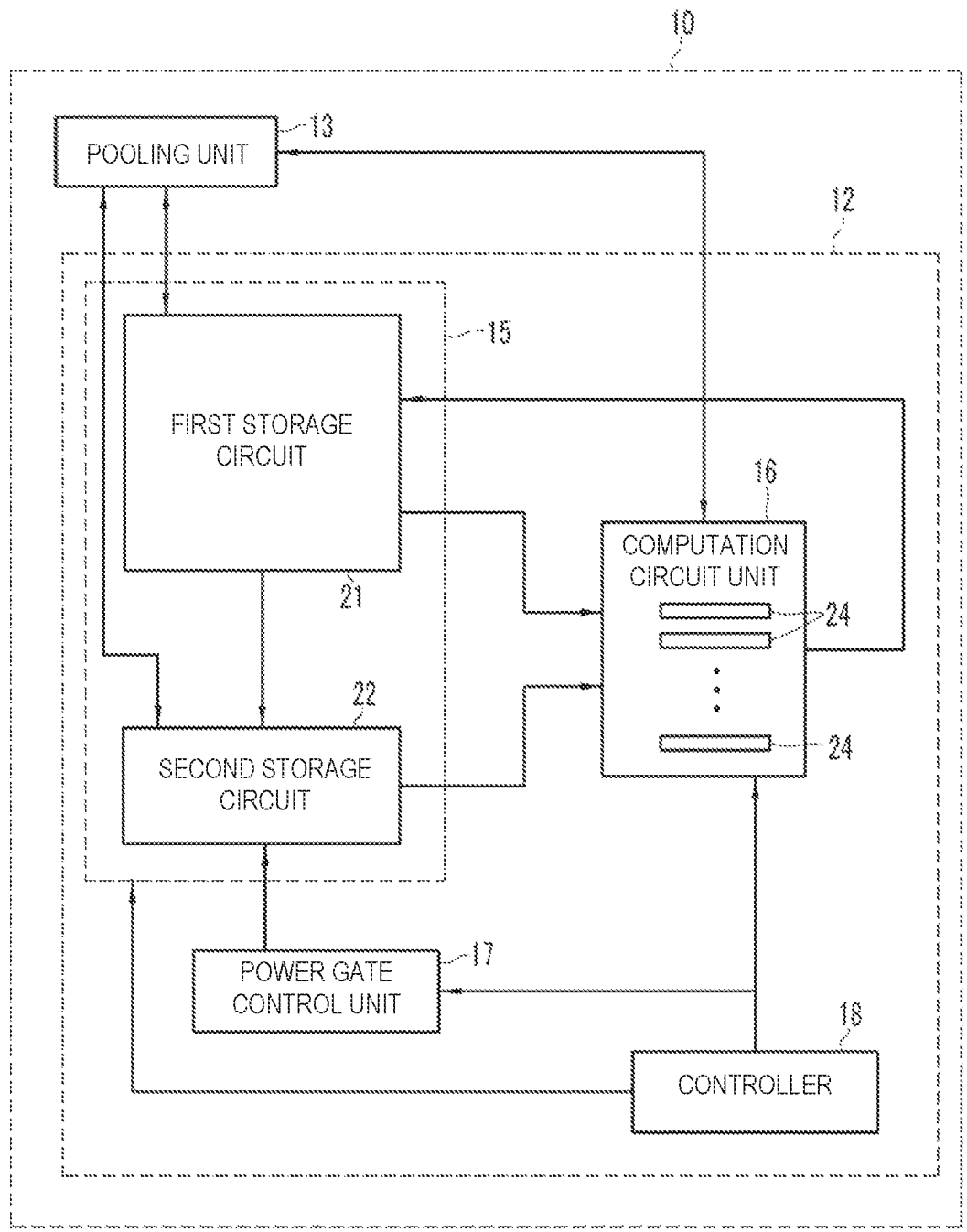
FIG. 1 is a block diagram illustrating an outline of a computation processing device.

In FIG. 1, a computation processing device 10 performs computation processing based on a convolutional neural network. The computation processing device 10 includes a convolutional processing unit 12 performing convolutional computation processing using a convolutional filter with respect to a channel (also referred to as a feature map), a pooling unit 13 performing pooling processing, and the like. In addition, the computation processing device 10 has a configuration or performing each processing piece of the convolutional neural such network, as normalization processing and activation processing, but in FIG. 1, only the convolutional processing unit 12 and the pooling unit 13 are illustrated.

The convolutional processing unit 12 corresponds to a neural network to which a plurality of layers are connected. Each of the layers includes one or a plurality of channels. The first layer is an input layer, and for example, is an image including each channel of RGB, and the like. First to third layers are connected to the neural network illustrated in FIG. 2 as an example. The first layer includes three channels ch1-1 to ch1-3, the second layer includes four channels ch2-1 to ch2-4, and the third layer includes two channels ch3-1 to ch3-2. The layer may be two layers or four or more layers. There can be one or a plurality of channels in each of the layers. In the previous and next layers, the number of channels may increase or decrease, or the number of channels may not be changed.

The channel includes a plurality of element data pieces that are two-dimensionally arrayed. The size of each of the channels, that is, the number of element data in a row direction and a column direction is any number, and is not particularly limited. In general, there is a tendency that in a lower layer on an input side, the number of channels is small and the size of the channel is large, and in an upper layer in which processing has progressed, the number of channels is large and the size of the channel is small. In this example, the two-dimensional channels will be described, but the channels may be one-dimensional or three or more-dimensional channels.

The convolutional processing unit 12 performs the convolutional computation processing using the convolutional filter with respect to a channel of a n-th layer, in which n is an integer of 1 or more, to generate a n+1-th layer. The generation of the layer is the generation of each of the channels configuring the layer, and the generation of the channel is the calculation of each of the element data pieces configuring the channel with convolutional computation. In the convolutional filter, weight data to be a weight with respect to the element data is two-dimensionally arrayed, and in this example, one convolutional filter includes 3×3 (3 rows and 3 columns) weight data pieces. Each of the weight data pieces of the convolutional filter is set to a value according to the purpose of the convolutional filter, or the like. Hereinafter, the n-th layer will be described as the previous layer with respect to the n+1-th layer, and the n+1-th layer will be described as the next layer with respect to the n-th layer. Therefore, the channel of the next layer is generated by the convolutional computation with respect to the channel of the previous layer.

The convolutional processing unit 12 generates each of the channels of the next layer by the convolutional computation with respect to each of the channels of the previous layer, in which all of the channels of the previous layer are used for each of the channels of the next layer. The convolutional processing unit 12 performs the convolutional computation by using a convolutional filter corresponding to a combination between the channel of the previous layer and the channel of the next layer.

Figure 2:
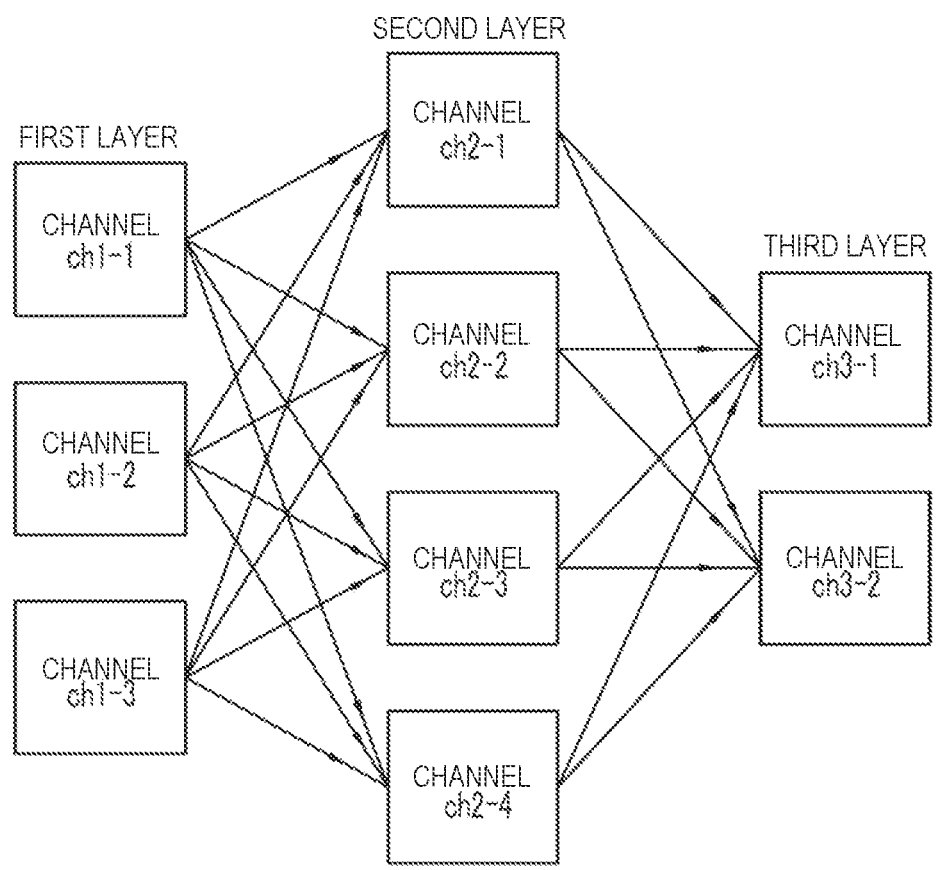
FIG. 2 is an explanatory diagram illustrating an example of connected layers of a convolutional neural network.

Therefore, in the example illustrated in FIG. 2, for example, in the generation of the channel ch3-1 of the third layer, when applying the convolutional computation to the channel ch2-1, a convolutional filter associated with a combination between the channel ch2-1 and the channel ch3-1 is used, and when performing the convolutional computation with respect to the channel ch2-2, a convolutional filter associated with a combination between the channel ch2-2 and the channel ch3-1 is used. As described above, in the generation of the channel ch3-1, the convolutional computation is performed by using four convolutional filters corresponding to four combinations between the channel ch3-1 and the channels ch2-1 to ch2-4. In the generation of the channel ch3-2, the convolutional computation is performed by using four convolutional filters corresponding to four combinations between the channel ch3-2 and the channels ch2-1 to ch2-4.

In order to generate one channel of the next layer, any number of channels of the previous layer can also be used, and in order to generate one channel of the next layer, one channel of the previous layer can also be used. All or a part of a plurality of convolutional filters used in one layer may have a common weight array. In a case where the convolutional filters have the common weight array, one convolutional filter with the common weight array may be prepared, and one convolutional filter may be used when calculating the plurality of channels.

The pooling unit 13 performs the pooling processing with respect to each channel of the final layer that is obtained by the convolutional computation processing of the convolutional processing unit 12 to generate a channel with a reduced size in the row direction and the column direction. In this example, the pooling unit 13 is configured to perform maximum value pooling processing. In the maximum value pooling processing, each of the channels is divided into a plurality of small pooling regions of 2 rows and 2 columns such that the regions do not overlap with each other, and the element data with the maximum value in each of the small pooling regions is output. The size of the small pooling region is not limited to 2 rows and 2 columns. The plurality of small pooling regions can also be divided to overlap with each other. Instead of the maximum value pooling processing, average value pooling processing of outputting the average value of the element data of the small pooling region may be performed. The convolutional computation processing of the convolutional processing unit 12 can be further performed with respect to the layer including the channel reduced by the pooling unit 13.

The convolutional processing unit 12 includes a memory unit 15, a computation circuit unit 16, a power gate control unit 17, and a controller 18 comprehensively controlling the above units. The memory unit 15 includes a first storage circuit 21 and a second storage circuit 22. The first storage circuit 21, for example, includes DRAM or the like. The first storage circuit 21 stores the element data of each of the channels of the layer to which the convolutional computation is applied, that is, the previous layer, in which the element data of each of the channels of the next layer calculated by the convolutional computation processing is written.

The second storage circuit 22 is a memory that is capable of retaining data (a bit) even in the case of blocking power supply, and reading out the retained data and writing in data by the power supply, that is, a non-volatile memory, and is provided as a non-volatile storage region of the memory unit 15. The second storage circuit 22 has a higher access speed than that of the first storage circuit 21. The second storage circuit 22 physically closer to the computation circuit unit 16 (having a shorter wiring length (distance)) than the first storage circuit 21 can be preferably used. It is preferable that the second storage circuit 22 is a memory in which each memory cell is a magnetoresistive memory (MRAM). MRAM has a smaller cell size than that of other non-volatile memories, is advantageous in the convolutional neural network in which the high-density integration of the memory cell is required, and is advantageous to reduce the power consumption since an operation voltage is low. The entire memory unit 15 may be the non-volatile storage region.

For example, the second storage circuit 22 retains all of the weight data of each of the convolutional filters used in the convolutional computation processing of each of the layers. When calculating the channel of one layer with the convolutional computation processing, the element data used in the convolutional computation processing of the layer (hereinafter, referred to as the convolutional computation processing of a target layer) is read out from the first storage circuit 21 prior to the convolutional computation processing of the target layer, and written and retained in the second storage circuit 22. The convolutional processing unit 12 performs the convolutional computation processing by using the element data and the weight data read out from the second storage circuit 22. In this example, each of the element data and the weight data is computation data.

The weight data used in the convolutional computation processing of the target layer may be read out from the first storage circuit 21 and written in the second storage circuit 22. In a case where the size of each storage region allocated to the element data or the weight data used in the convolutional computation processing of the target layer is smaller than the total number of element data or weight data, the element data or the weight data stored in the second storage circuit 22 may be updated to another element data or weight data read out from the first storage circuit 21, in accordance with a computation progress status or the like.

The element data and the weight data have a constant length with a fixed data length of N bits, in which N is an integer of 2 or more, and in this example, an effective data length (an upper bit number) is set in advance with respect to the element data and the weight data for each layer, for example, in accordance with a computation accuracy to be required. In a case where M is an integer of 2 or more, and the effective data length is M bits, "N≥M" is obtained, and the effective data length of the element data and the weight data is identical to or shorter than the original data length.

The effective data length, for example, can be changed on the basis of a computation accuracy set in advance, in accordance with an application that is executed by using the computation processing device 10, and an operation mode (for example, an operation mode according to the remaining battery life, operation modes with different recognition accuracies required in the processing of the convolutional neural network, and the like) of equipment provided with the computation processing device 10. The layers may have different effective data lengths, or may have the same effective data length.

In this example, it is described that the element data and the weight data that are multiplied in the convolutional computation when calculating the channel of one layer have the same effective data length, but the element data and the weight data may have different effective data lengths. In this example, a case will be described in which the element data and the weight data have the same effective data length, but there are layers with different effective data lengths.

In this example, in the computation circuit unit 16, a plurality of sum-of-product computation circuits 24 are provided in parallel, and the convolutional computation that is sum-of-product computation is performed in parallel by the plurality of sum-of-product computation circuits 24. The sum-of-product computation performed by the sum-of-product computation circuit 24 includes weighting computation of multiplying the element data and the weight data by the corresponding data pieces, and computation of adding computation results of the weighting computation to each other. One sum-of-product computation circuit 24 calculates one element data piece of one channel by the convolutional computation.

In the computation circuit unit 16, for example, 64 sum-of-product computation circuits 24 are provided, and a maximum of 64 element data pieces are calculated in parallel. In the sum-of-product computation circuit 24, the effective data length set in advance by the controller 18 is set, a data length that is a computation target to be set is changed, and the computation processing is performed with respect to a portion of the element data and the weight data of the set effective data length. Specifically, the computation is performed by using upper bits (a part of data) for M bits indicated by the effective data length as the data of the computation target.

The configuration of the computation circuit unit 16 and the sum-of-product computation circuit 24 is not particularly limited. For example, in the sum-of-product computation circuit 24, multipliers with the same number as that of the weight data of one convolutional filter, and an adder adding multiplication results of the multipliers may be provided, and in each of the sum-of-product computation circuits 24, multiplication between each weight data piece of one convolutional filter and the element data corresponding to the weight data may be performed in parallel, and multiplication results thereof may be added by the adder.

In a case where the element data and the weight data have different effective data lengths, each of the effective data lengths may be set in the sum-of-product computation circuit 24. In the computation circuit unit 16, a bit number adjustment circuit (not illustrated) is provided, and the data length of the computation result (the element data) output from each of the sum-of-product computation circuits 24 is converted to a predetermined data length by the bit number adjustment circuit, and then, is written in the first storage circuit 21.

As described below in detail, the power gate control unit 17 controls power supply to each memory block configuring the second storage circuit 22, that is, controls power gating, under the control of the controller 18. The effective data length is set by the controller 18, and the power gate control unit 17 controls the power gating, on the basis of the set effective data length.

The controller 18 acquires the effective data length of the layer, for each layer. The effective data length that is set, for example, in accordance with the operation mode or the like of the equipment provided with the computation processing device 10, as described above, is acquired by the controller 18. In the convolutional computation, the controller 18 sets the acquired effective data length in the power gate control unit 17, and sets the effective data length in each of the sum-of-product computation circuits 24. In this example, the controller 18 is a data length setting unit.

Figure 3:
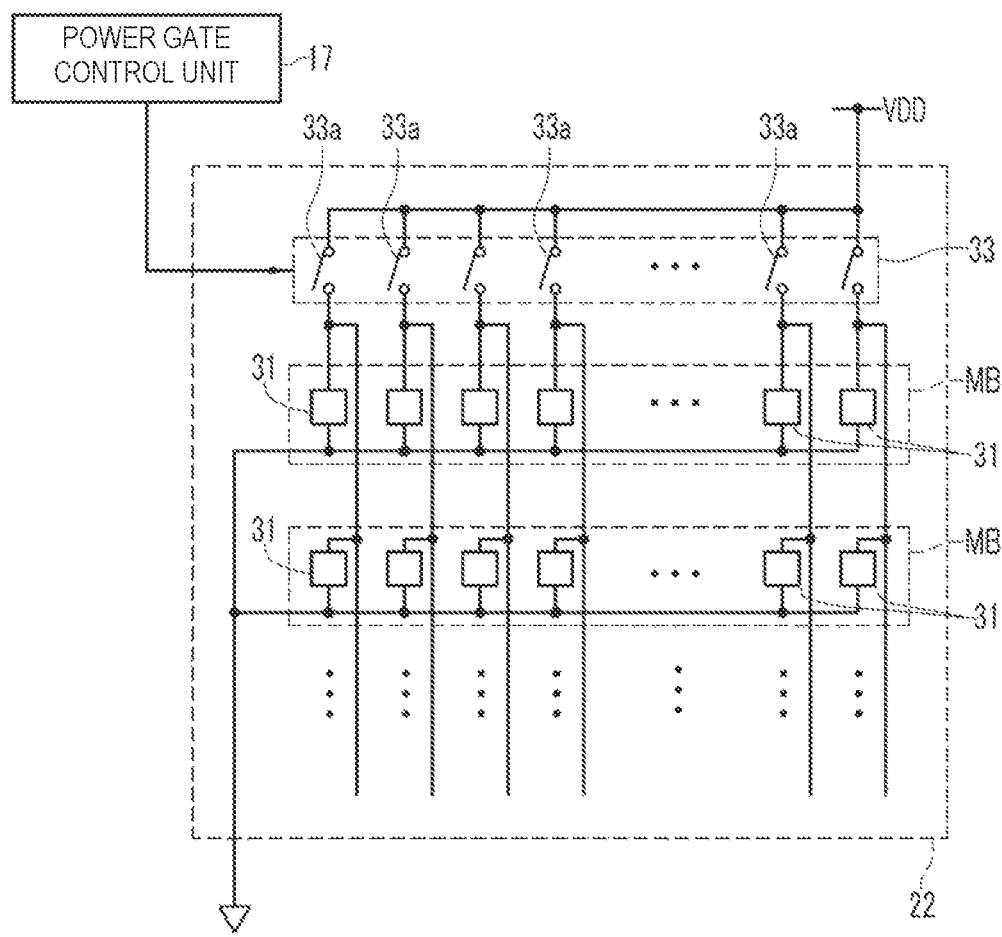
FIG. 3 is a block diagram illustrating a configuration of a second storage circuit.

In FIG. 3, in the second storage circuit 22, a memory array is provided in which a plurality of non-volatile memory cells 31 are arrayed into the shape of a matrix, and the memory array is divided into a plurality of memory blocks MB. In this example, one memory block MB includes N memory cells 31 arranged in one row in a horizontal direction of the drawing, and each of the memory blocks MB retains one data piece of a maximum of N bits. The number of memory cells 31 configuring the memory block MB may be set in accordance with the maximum data length of data to be retained.

Each of the memory cells 31 with the same bit in each of the memory blocks MB is connected by a common power line, and a driving voltage (VDD) is applied through the power line. For example, each of the memory cells 31 of the first bit in each of the memory blocks MB is connected to a power line corresponding to the first bit, and each of the memory cells of the second bit is connected to a power line corresponding to the second bit.

In the second storage circuit 22, a PG switch 33 configuring a power gate unit together with the power gate control unit 17 is provided. The PG switch 33 includes a plurality of PG switches 33a provided on each of the power lines connected to the memory cells 31. Each of the PG switches 33a is provided corresponding to each of the memory cells 31 of each of the bits in each of the memory blocks MB. The PG switch 33a includes a MOS transistor or the like, and the on and off of the PG switch is controlled by the power gate control unit 17. The on and off of each of the PG switches 33a can be independently controlled by the power gate control unit 17.

In a case where one PG switch 33a is turned on, a driving voltage is applied to each of the memory cells 31 connected to the PG switch 33a through the power line, and thus, the memory cells 31 receives the power supply, and thus, the bit can be written in and read out. In a case where one PG switch 33a is turned off, a driving voltage is not applied to each of the memory cells 31 connected to the PG switch 33a through the power line, and the power supply to the memory cell 31 is blocked. Accordingly, it is possible to perform the power gating with respect to the memory cell 31 storing one or a plurality of specific bits of each of the memory blocks MB. The write and read of the bit of the memory cell 31 to which the power supply is blocked is not available.

In the convolutional computation processing, in a case where the effective data length is set from the controller 18, the power gate control unit 17 turns on the PG switches 33a corresponding to the upper M bits indicated by the effective data length of the memory block MB, and turns off the other PG switches 33a. Accordingly, the power supply to the memory cell 31 retaining bits other than the upper bits of the bit number used in the convolutional computation processing of the target layer is blocked to reduce the power consumption. When data is written in the second storage circuit 22, the power gate control unit 17 turns on all of the PG switches 33a, and thus, enables the element data and the weight data to be written in each of the memory blocks MB with the original data length.

Figure 4:
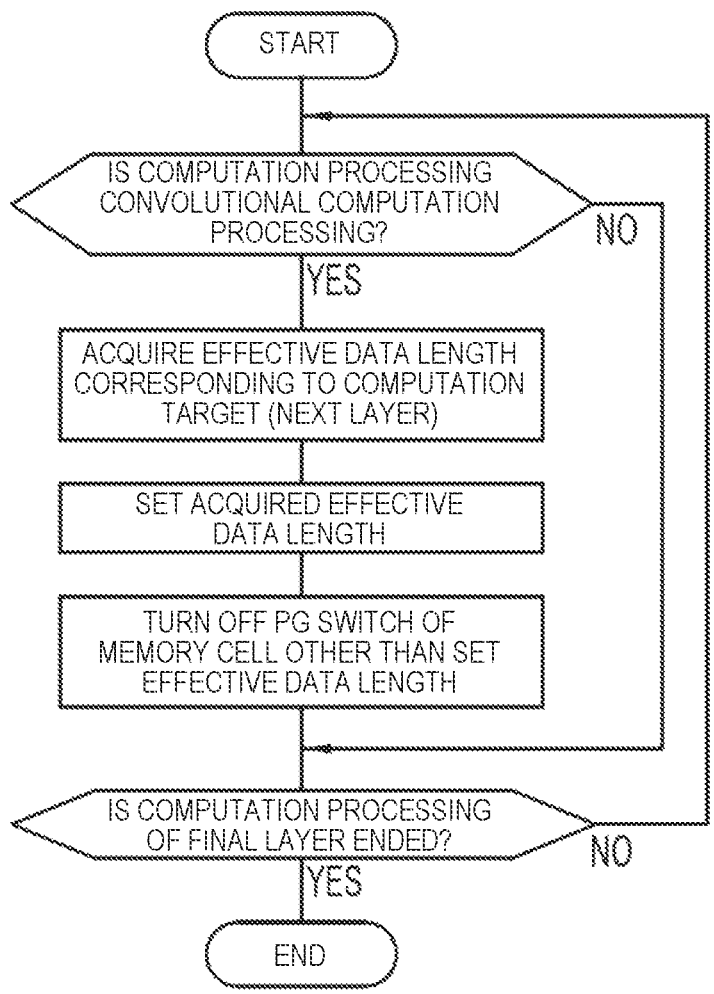
FIG. 4 is a flowchart illustrating control of an effective data length.

When performing the computation processing based on the convolutional neural network, as illustrated in FIG. 4, in the computation processing device 10, the controller 18 determines whether the computation processing is the convolutional computation processing. In the convolutional computation processing, the effective data length corresponding to the layer that is a calculation target is acquired by the controller 18, and the effective data length is set in the power gate control unit 17. Prior to such setting, the element data used in the current convolutional computation is read out from the first storage circuit 21, and is written and retained in the second storage circuit 22.

In a case where the effective data length is set, the power gate control unit 17 turns on the PG switches 33 for the upper bits indicated by the set effective data length, and turns off the other PG switches 33. Accordingly, in each of the memory blocks MB of the second storage circuit 22, power is supplied to the memory cells 31 for the effective data length, and the power supply to the other memory cells 31 is blocked. Therefore, the power supply to the memory cell 31 retaining a data portion (lower bits) that is not used in the convolutional computation of the element data and the weight data stored in the second storage circuit 22, including the element data and the weight data used in the convolutional computation processing of the target layer, is blocked. Accordingly, the power consumption is reduced while enabling the read of the data portion of the effective data length of the element data and the weight data used in the computation.

Figure 5:
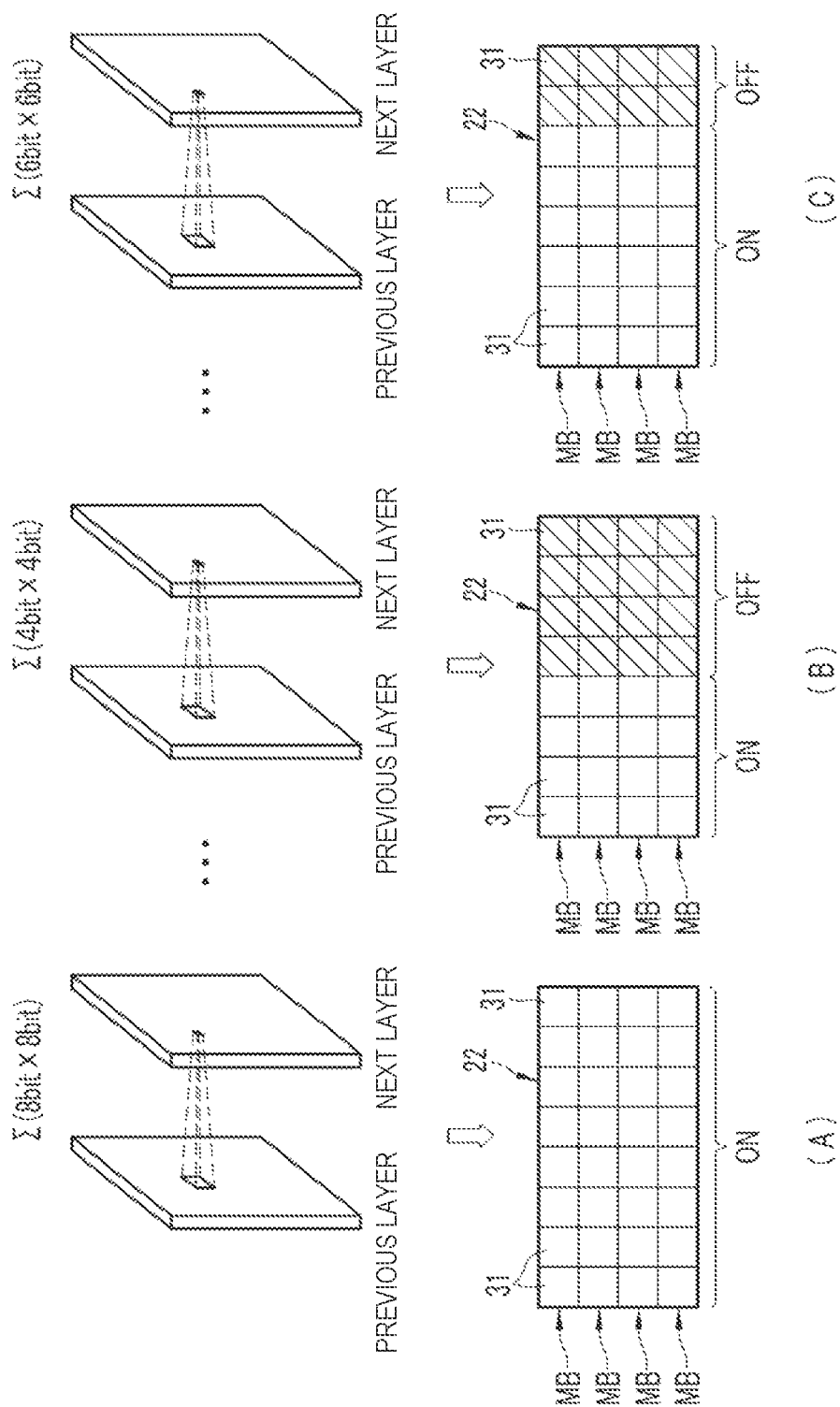
FIG. 5 is an explanatory diagram illustrating a power gating state of the second storage circuit.

As an example of the case of setting the original data length of the element data of the previous layer and the weight data of the convolutional filter applied to the previous layer to 8 bits (N=8) is illustrated in FIG. 5, in a case where the element data of the next layer is calculated by the convolutional computation processing with the effective data length as 8 bits (M=8), as illustrated in FIG. 5(A), power is supplied to all of the memory cells 31 for 8 bits in each of the memory blocks MB of the second storage circuit 22 (ON). In this case, the element data of 8 bits and the weight data of 8 bits are read out from the second storage circuit 22, and are sent to the computation circuit unit 16.

After the computation as described above, as illustrated in FIG. 5(B), in a case where the element data of the next layer is calculated with the effective data length as 4 bits (M=4), power is supplied to the memory cells 31 of the upper 4 bits in each of the memory blocks MB of the second storage circuit 22 (ON), and the power supply to the memory cells 31 of the lower 4 bits is blocked (OFF). In this case, in the element data and the weight data, the upper 4 bits corresponding to the effective data length are read out from the second storage circuit 22, and are input to the computation circuit unit 16 as the element data and the weight data of 4 bits to be provided to the computation.

After that, as illustrated in FIG. 5(C), in a case where the element data of the next layer is calculated with the effective data length as 6 bits (M=6), in each of the memory blocks MB, power is supplied to the memory cells 31 of the upper 6 bits (ON), and the power supply to the memory cells 31 of the lower 2 bits is blocked (OFF). In this case, in the element data and the weight data, the upper 6 bits corresponding to the effective data length are read out from the second storage circuit 22, and are input to the computation circuit unit 16 as the element data and the weight data of 6 bits to be provided to the computation. Power supply to the memory cells 31 corresponding to the lower 2 bits in the upper 6 bits of the weight data currently read out is blocked when the effective data length is 4 bits. However, the memory cell 31 is non-volatile, and thus, data for 2 bits is not lost, data for the upper 6 bits of the weight data of 8 bits are read out from the second storage circuit 22, and the computation with the effective data length is accurately performed in the computation circuit unit 16.

The PG switch controlling the application of the driving voltage in memory block unit may be provided, and the power supply to each of the memory cells 31 of the memory blocks MB not storing the weight data or the element data or storing the weight data and the element data irrelevant to the layer for performing the convolutional computation processing may be blocked. In the convolutional computation of the computation circuit unit 16, the power supply to each of the memory cells 31 of the memory blocks MB other than the memory blocks MB storing the element data and the weight data provided to the computation circuit unit 16 in the convolutional computation may be blocked.

Figure 6:
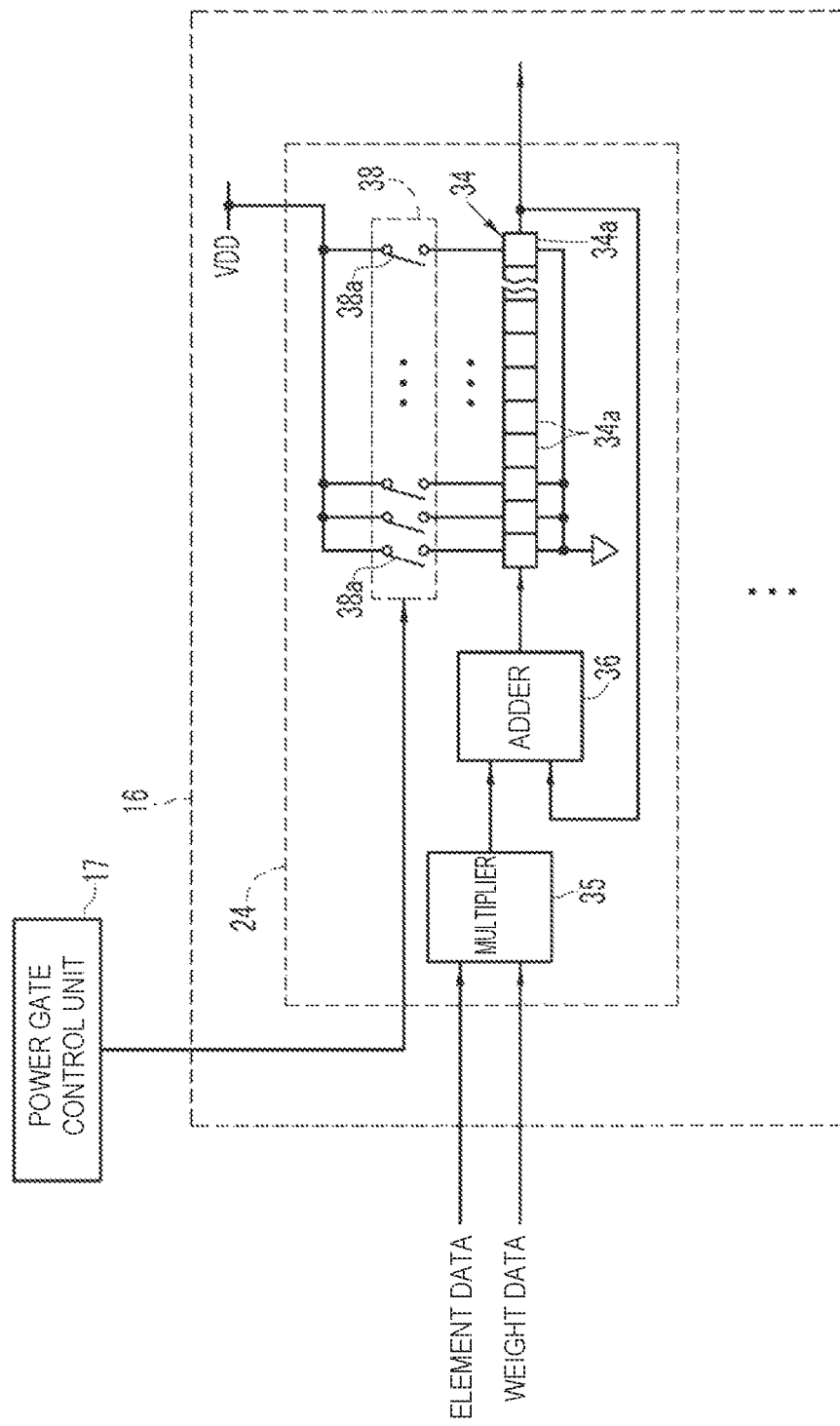
FIG. 6 is a block diagram illustrating a configuration of a sum-of-product computation circuit including a register subjected to power gating.

As illustrated in FIG. 6, the power gating may be performed with respect to a register 34 configuring the sum-of-product computation circuit 24. In this example, the sum-of-product computation circuit 24 includes the register 34, a multiplier 35, and an adder 36. The multiplier 35 multiplies the element data and the weight data, the adder 36 adds data retained in the register 34 and a multiplication result of the multiplier 35. The register 34 retains an addition result of the adder 36. The register 34 includes a plurality of bit cells 34a each storing 1 bit, and the number of bit cells 34a corresponds to the maximum data length of the computation result of the sum-of-product computation circuit 24, and for example, 24 bit cells 34a are provided corresponding to 24 bits.

In the sum-of-product computation circuit 24, a switch unit 38 is provided. The switch unit 38 configures the power gate unit together with the power gate control unit 17, as with the PG switch 33 of the second storage circuit 22. The switch unit 38 includes a plurality of PG switches 38a provided respectively corresponding to the bit cells 34a, and each of the PG switches 38a is provided on the power line connected to the corresponding bit cell 34a. Each of the PG switches 38a includes a MOS transistor or the like, and the on and off thereof is independently controlled by the power gate control unit 17.

In a case where the PG switch 38a is turned on, a driving voltage is applied to the bit cell 34a corresponding to the PG switch 38a, and thus, the bit cell 34a receives the power supply, and thus, the bit can be written in and read out. In a case where the PG switch 38a is turned off, a driving voltage is not applied to the bit cell 34a connected to the PG switch 38a through the power line, and power supply to the bit cell 34a is blocked such that the bit is not capable of being written in and read out from the bit cell 34a. Accordingly, it is possible to perform the power gating with respect to one or a plurality of specific bit cells 34a of each of the registers 34.

In the convolutional computation processing, in the power gate control unit 17, the data length of the computation result calculated by the sum-of-product computation circuit 24 in the convolutional computation processing is set as the effective data length by the controller 18. The effective data length of the computation result is set from the number of channels of the previous layer, a filter size of the convolutional filter, and the effective data length of the element data and the weight data, and can be known before the computation. The power gate control unit 17 turns on the PG switches 38a corresponding to a bit width for the bit number indicated by the effective data length of the computation result, and turns off the other PG switches 38a. Accordingly, in the convolutional computation, the power supply to the bit cells 34a (unused bit cells 34a other than the effective data length) in a region exceeding the data length of the computation result calculated by the sum-of-product computation circuit 24 with the convolutional computation is blocked to reduce the power consumption.

In the register that is provided in the sum-of-product computation circuit 24 and retains the multiplication result and the addition result, a register retaining data that is input to the sum-of-product computation circuit 24, or the like, similarly, it is possible to perform the power gating with respect to the bit cell.

Figure 7:
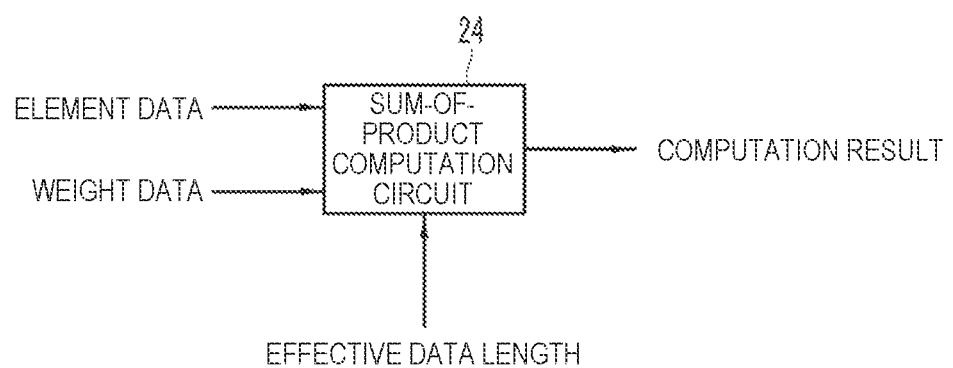
FIG. 7 is a block diagram illustrating the sum-of-product computation circuit including a cell macro to which a signal for designating the effective data length is input.
Figure 8:
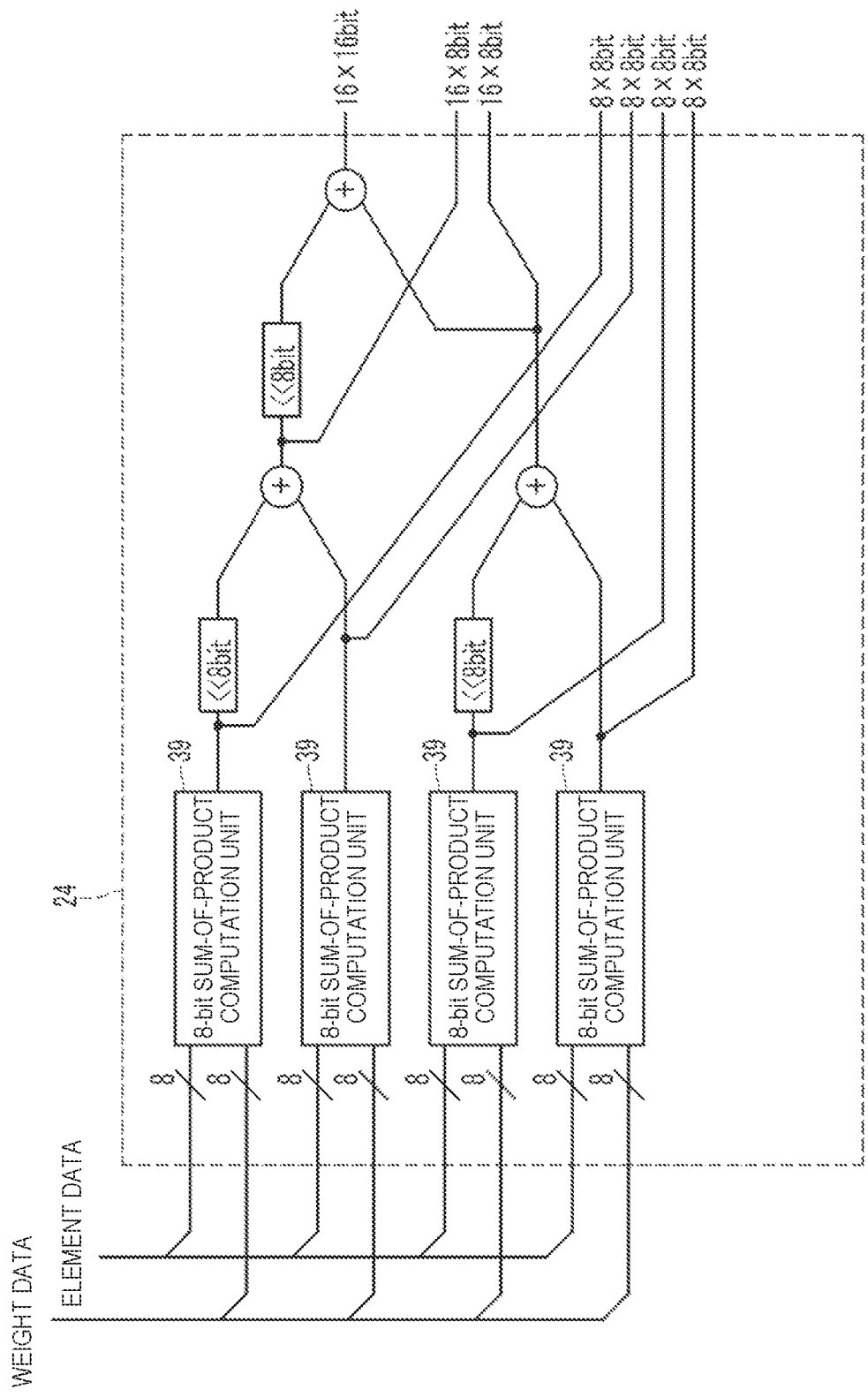
FIG. 8 is a block diagram illustrating the sum-of-product computation circuit including four sum-of-product computation units with a short input data length.

In a case where the sum-of-product computation circuit 24 of the computation circuit unit 16 includes a cell macro of ASIC, as illustrated in FIG. 7, a signal for designating the effective data length may be input to the sum-of-product computation circuit 24, the data length that is a computation target may be changed by the signal, in accordance with the effective data length. As with an example illustrated in FIG. 8, the sum-of-product computation circuit 24 may be divided into a plurality of sum-of-product computation units 39 with an input data length shorter than the maximum input data length of the data that is input to the sum-of-product computation circuit, and may suitably combine (add) the output data and data obtained by performing bit shift with respect to the output data, in accordance with the effective data length, to obtain the computation result. In the example illustrated in FIG. 8, the sum-of-product computation circuit 24 of 16×16 bits includes four sum-of-product computation units 39 with an input data length of 8 bits, and the like. In such a configuration, in a case where the data length of the computation target decreases, the computation is available in which the parallel degree of sum-of-product computation is improved. The sum-of-product computation circuit 24 can be operated as one sum-of-product computation element of 16×16 bits, and can be operated as two sum-of-product computation elements of 16×8 bits and four sum-of-product computation elements of 8×8 bits in parallel.

In the above description, a part (the second storage circuit) of the memory unit is the non-volatile memory, and the entire memory unit may be the non-volatile memory.

Second Embodiment

In a second embodiment, the convolutional computation processing is performed by efficiently using the convolutional filter retained in the non-volatile storage region to which the power gating is performed, and thus, the power consumption is effectively reduced. The basic computation processing based on the convolutional neural network of the computation processing device in the second embodiment is the same as that in the first embodiment, and the names, the terms, or the like of the data and the like are the same as those in the first embodiment, and thus, the detailed description thereof will be omitted. The same reference numerals will be applied to substantially the same constituents as those in the first embodiment, and the detailed description thereof will be omitted.

Figure 9:
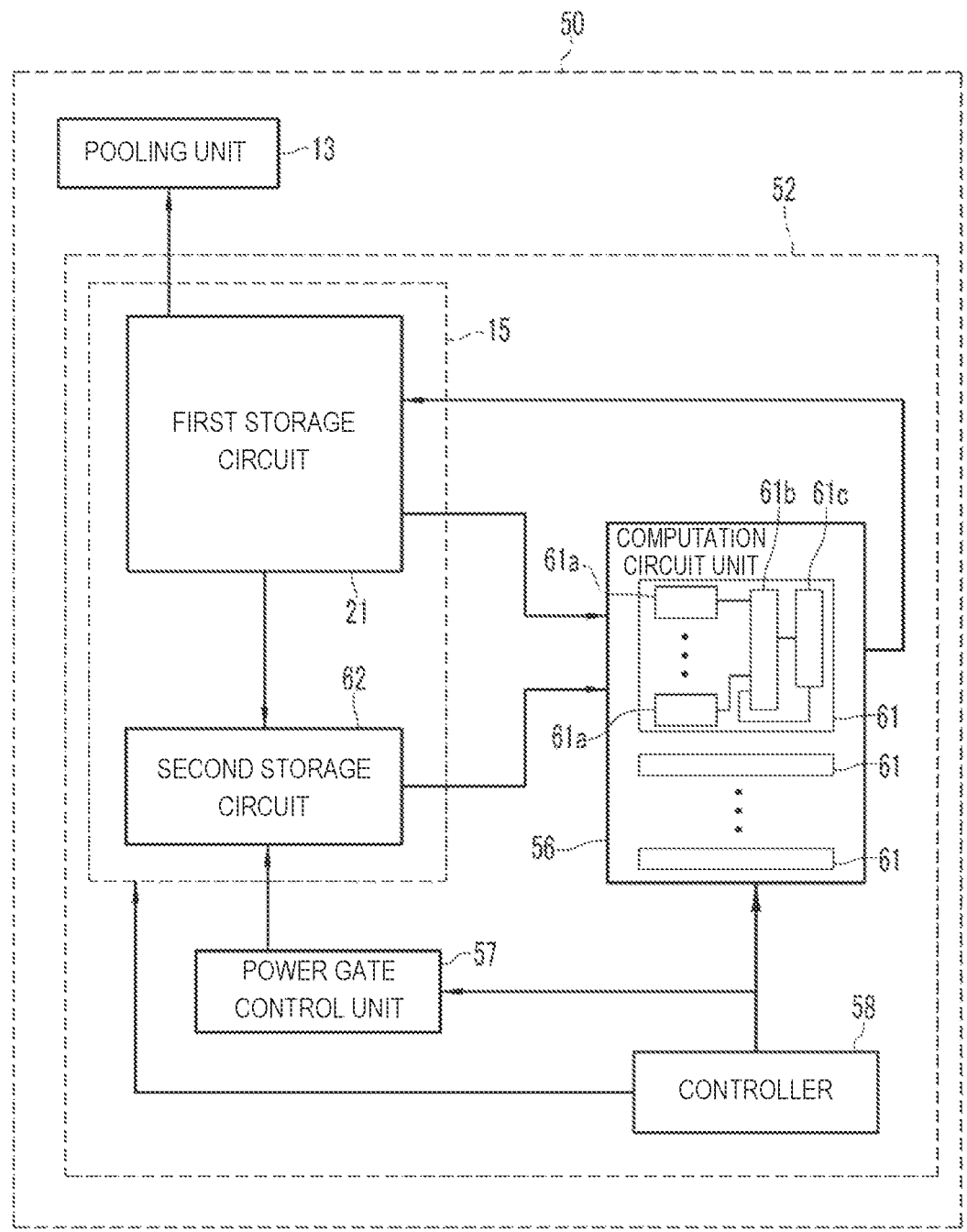
FIG. 9 is a block diagram illustrating an outline of a computation processing device of a second embodiment.

In FIG. 9, a computation processing device 50 includes a convolutional processing unit 52, the pooling unit 13, and the like. In addition, the computation processing device 50 includes normalization processing, activation processing (not illustrated), and the like. The convolutional processing unit 52 includes the memory unit 15, a computation circuit unit 56, a power gate control unit 57, and a controller 58 comprehensively controlling the above units.

The memory unit 15 includes the first storage circuit 21 and a second storage circuit 62. The first storage circuit 21, for example, is a high-capacity memory including DRAM or the like. The first storage circuit 21 stores the element data of each of the channels of the layer to which the convolutional computation is applied, that is, the previous layer, in which the element data of each of the channels of the next layer calculated by the convolutional computation is written. In the first storage circuit 21, the weight data of each of the convolutional filters used in the convolutional computation processing of each of the layers is written.

The second storage circuit 62 of the memory unit 15 is the same as the second storage circuit 22 in the first embodiment (refer to FIG. 1), except that the unit of the power gating is different, as described below. In the second storage circuit 62, the weight data of the convolutional filter read out from the first storage circuit 21 is written such that the weight data of the plurality of convolutional filters used in the convolutional computation processing of the target layer is retained. In a case where the memory size of the second storage circuit 62 is smaller than the total number of weight data used in the convolutional computation of one layer, for example, the weight data of the used convolutional filter stored in the second storage circuit 62 is updated to weight data of another convolutional filter read out from the first storage circuit 21, in accordance with the computation progress status or the like. In this example, the convolutional filter is 3 rows and 3 columns, but is not limited thereto.

The computation circuit unit 56 performs the convolutional computation processing by using the element data read out from the first storage circuit 21 and the weight data read out from the second storage circuit 62. The convolutional processing unit 52 includes a plurality of, for example, 64 sum-of-product computation circuits 61, and each of the sum-of-product computation circuits 61 includes nine multipliers 61a provided in parallel, an adder 61b, a register 61c retaining an addition result of the adder, and the like. The adder 61b adds each multiplication result of the multiplier 61a and the data retained in the register 61c.

As with the first embodiment, the element data may be read out from the first storage circuit 21 and written in the second storage circuit 62, and the convolutional computation processing may be performed by using the element data and the weight data read out from the second storage circuit 62.

Focusing on one sum-of-product computation circuit 61, the sum-of-product computation circuit 61 multiplies nine element data pieces in a small region corresponding to the convolutional filter in one channel of the previous layer and nine weight data pieces of the convolutional filter by the corresponding data pieces in parallel with nine multipliers 61a. By adding the multiplication results of the multipliers 61a with the adder 61b, data is calculated in which the element data in the small region corresponding to the convolutional filter in one channel of the previous layer is convolved with the convolutional filter. By sequentially adding data in which the element data of the small region at the same position (coordinates) of each of the channels is convolved with the convolutional filter, and convolved data of another channel retained in the register 61c with the adder 61b while sequentially switching the channel of the previous layer, one element data piece of the next layer is calculated. As described above, the convolutional filter corresponding to the combination between the channel of the previous layer and the channel of the next layer is used, and thus, when generating one channel of the next layer, the convolutional filter is also switched each time when the channel of the previous layer is switched.

In the sum-of-product computation circuit 61, for example, the register (not illustrated) retaining data to be input is provided, the element data and the weight data to be input are retained in the register, and the multiplier 61a multiplies the element data and the weight data retained in the register. The element data retained in the register is retained until the next element data is input, and the weight data retained in the register is retained until the next weight data is input.

The computation circuit unit 56 operates the plurality of sum-of-product computation circuits 61 calculating the element data as described above, in parallel. Control is performed such that the element data of the same channel of the previous layer is input and the weight data of the same convolutional filter is input to each of the sum-of-product computation circuits 61. According to such control, the computation circuit unit 56 calculates a plurality of (in this example, 64) element data pieces in one channel of the next layer in parallel.

Each of the channels of the previous layer is divided into a plurality of small regions with the same size as that of the convolutional filter such that the center of the region is the position of the element data to be calculated. Each of the small regions partially overlaps with another small region. The number of small regions in the channel of the previous layer is the same as the number of element data of the next layer. The element data of a maximum 64 small regions of one channel is input to each of the sum-of-product computation circuits 61 of the computation circuit unit 56 in parallel such that each of the element data pieces of one small region is input to one sum-of-product computation circuit 61.

As described above, a mode of calculating the plurality of element (pixel) data pieces of one channel of the next layer in parallel by using a common convolutional filter is referred to as pixel parallel.

As described below in detail, the power gate control unit 57 controls the power gating of each of the memory blocks MB configuring the second storage circuit 62, under the control of the controller 58.

Figure 10:
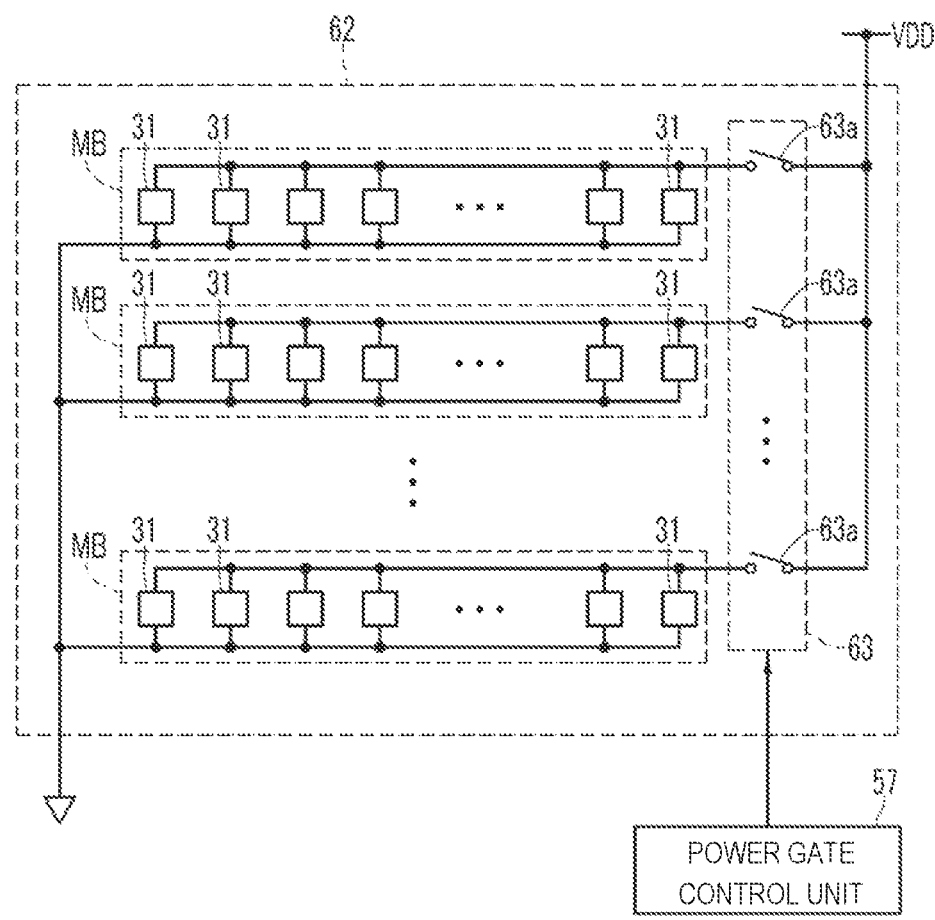
FIG. 10 is a block diagram illustrating a second storage circuit of the second embodiment.

As illustrated in FIG. 10, the second storage circuit 62 includes a plurality of memory blocks MB each including N memory cells 31. Each of the memory blocks MB stores the weight data. Each of the memory blocks MB is connected by a power line corresponding to each of the memory blocks, and a driving voltage (VDD) is applied through the power line. Each of the memory cells 31 of each of the memory blocks MB is connected to the power line corresponding to the memory block MB.

In the second storage circuit 62, a switch unit 63 configuring a power gate unit together with the power gate control unit 57 is provided. The switch unit 63 includes a plurality of PG switches 63a provided on each of the power lines. Each of the PG switches 63a corresponding to each of the memory blocks MB is provided. The PG switch 63a includes a MOS transistor or the like, and the on and off of the PG switch is independently controlled by the power gate control unit 57.

According to the configuration described above, in a case where one PG switch 63a is turned on, the corresponding memory block MB receives the power supply, and thus, data can be written in and read out. In a case where one PG switch 63a is turned off, power supply to the memory block MB corresponding to the PG switch 63a is blocked. Accordingly, it is possible to perform the power gating for each memory block MB. In the memory block MB to which the power supply is blocked, data is not capable of being written in and read out.

When each of the sum-of-product computation circuits 61 performs the convolutional computation, a block designation signal for designating the memory block MB retaining the weight data used in the convolutional computation, that is, the memory block MB retaining the weight data read out from the second storage circuit 62 to be input to the computation circuit unit 56 is input to the power gate control unit 57 from the controller 58. The power gate control unit 57 turns on the PG switch 63a corresponding to the memory block MB designated by the block designation signal. Accordingly, it is possible to read out data from the memory block MB used in the convolutional computation. Each of the sum-of-product computation circuits 61 multiplies the weight data and the element data by the corresponding data pieces in parallel, and adds the multiplication results. In this example, one convolutional filter includes nine weight data pieces, and thus, nine memory blocks MB can be read out for one convolutional filter.

Figure 11:
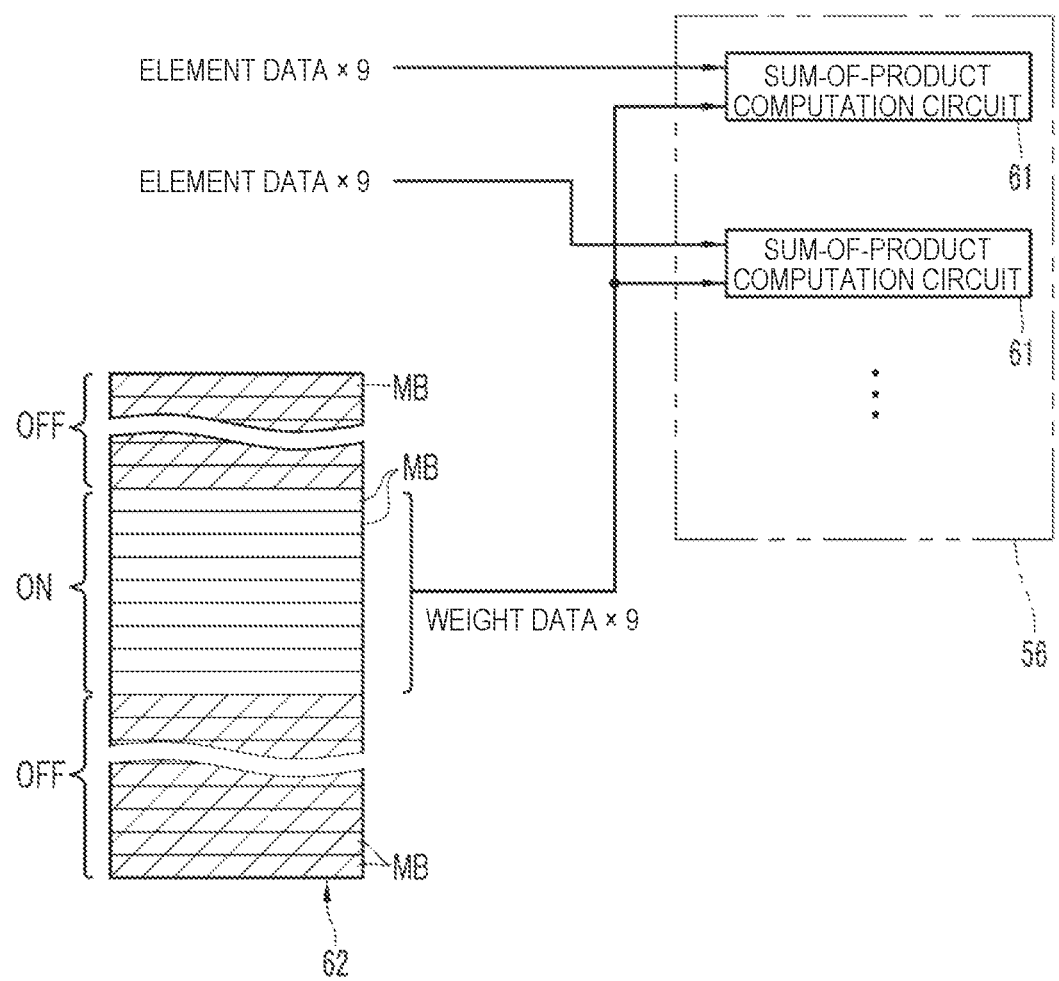
FIG. 11 is an explanatory diagram illustrating an input state of data to a sum-of-product computation circuit.

In this example, when each of the sum-of-product computation circuits 61 performs the convolutional computation, one common convolutional filter is used, and thus, as illustrated in FIG. 11, nine weight data pieces of one convolutional filter read out from nine memory blocks MB in which power is supplied to the second storage circuit 62 are input to each of the sum-of-product computation circuits 61 of the computation circuit unit 56 to which each of nine element data pieces is input.

On the other hand, in the convolutional computation, the power gate control unit 57 turns off the PG switch 63a corresponding to memory block MB retaining the weight data that is not used in the convolutional computation, that is, the memory block MB from which the weight data is not read out. Accordingly, the power supply to the memory block MB that is not used in the convolutional computation is blocked to reduce the power consumption. When data is written in the second storage circuit 62, for example, the power gate control unit 57 turns on the PG switch 63a corresponding to the memory block MB in which the data is to be written.

Figure 12:
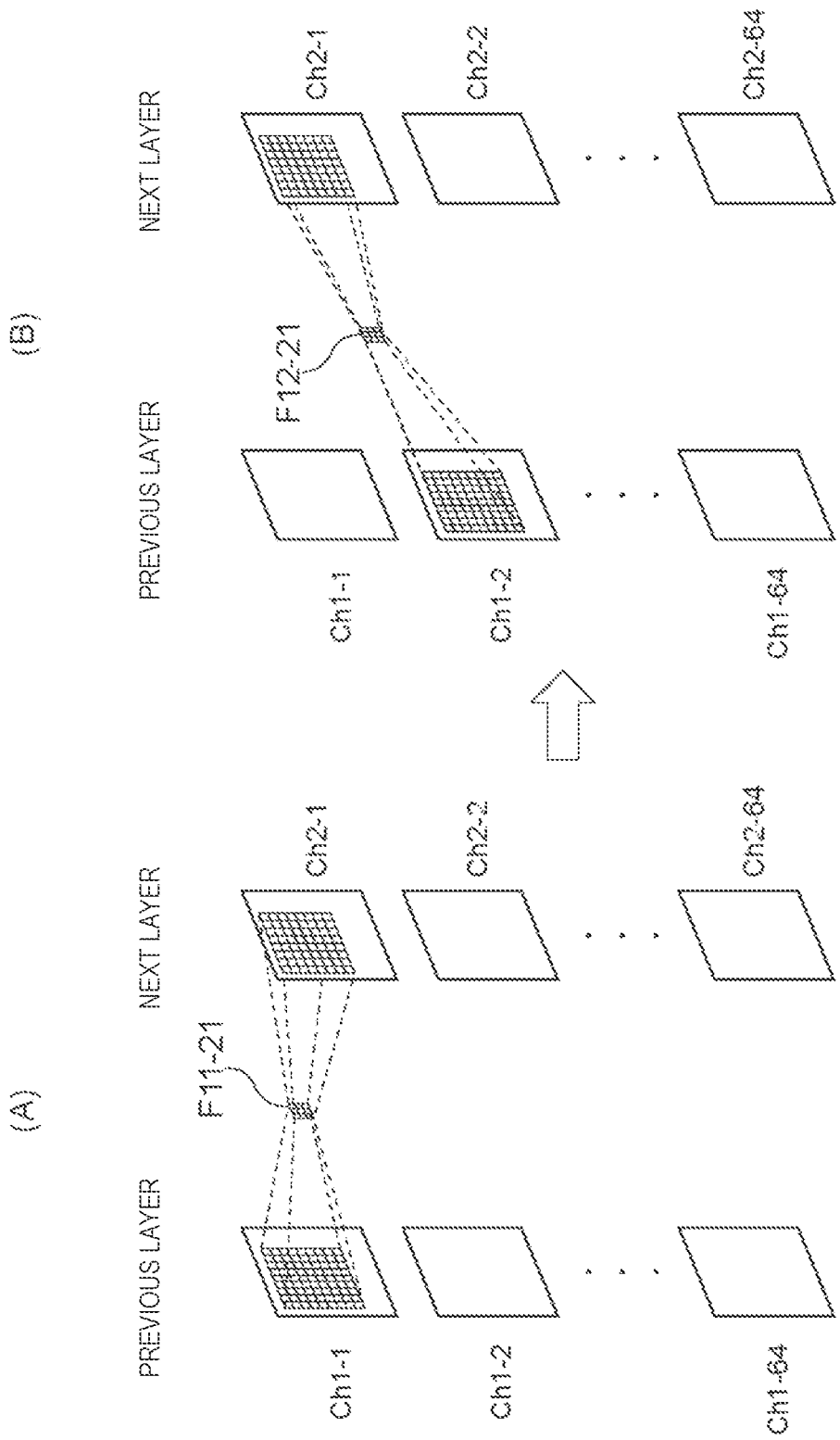
FIG. 12 is an explanatory diagram illustrating a state of pixel-parallel convolutional computation processing of the computation processing device.

According to the configuration described above, as with an example illustrated in FIG. 12, a case will be described in which each of the channels of the next layer is generated from each of the channels of the previous layer. First, the weight data of the plurality of convolutional filters for generating each of the channels of the next layer used in the convolutional computation processing is read out from the first storage circuit 21, and is written in the second storage circuit 62. After that, the channels of the next layer are generated one by one.

For example, in the case of generating the first channel Ch2-1 of the next layer, first, each weight data piece of a convolutional filter F11-21 corresponding to a combination between the first channel Ch1-1 and the first channel Ch2-1 of the previous layer is read out from the second storage circuit 62. Accordingly, prior to such reading, the PG switches 63a corresponding to each of the memory blocks MB retaining each of the weight data pieces of the convolutional filter F11-21 are turned on, and the off state of the other PG switches 63a is maintained. After that, nine weight data pieces are read out from each of the memory blocks MB corresponding to the PG switches 63a that are turned on, and are set in each of the sum-of-product computation circuits 61, that is, retained in the register of each of the multipliers 61a.

After the weight data is set, 64 small regions with the same number as that of sum-of-product computation circuits 61 are selected from a plurality of small regions of the first channel Ch1-1 of the previous layer, and the element data of each of the selected small regions is sent to the computation circuit unit 56. As described above, each of the element data pieces of one small region is input to one sum-of-product computation circuit 61, and thus, each of the element data pieces of each of the selected small regions is input to each of the sum-of-product computation circuits 61, and is retained in the register. After that, each of the sum-of-product circuits computation 61 calculates data in which the element data of the small region is convolved with the convolutional filter F11-21, by using nine element data pieces and nine weight data pieces of the channel Ch1-1 retained in the register (FIG. 12(A)). Such convolved data is retained in the register 61c.

As described above, in a case where the convolutional computation for 64 small regions of the channel Ch1-1 is completed, a convolutional computation target in the previous layer is moved to a channel Ch1-2 (FIG. 12(B)). The PG switches 63a corresponding to each of the memory blocks MB retaining each weight data piece of a convolutional filter F12-21 corresponding to a combination between the channel Ch1-2 and the channel Ch2-1 are turned on, and the other PG switches 63a are turned off. Nine weight data pieces of the convolutional filter F12-21 are read out from the second storage circuit 62, and are set in each of the sum-of-product computation circuits 61.

After that, 64 small regions are selected from a plurality of small regions the second channel Ch1-2 of the previous layer, and the element data of each of the selected small regions is sent to the computation circuit unit 56. As described above, each of the element data pieces of each of the small regions is input to each of the sum-of-product computation circuits 61, and is retained in the register. The small region selected by the channel Ch1-2 is at the same position as the small region selected by the channel Ch1-1, and the element data of the small region at the same position is input to the same sum-of-product computation circuit 61. Each of the sum-of-product computation circuits 61 convolves the element data of the corresponding small region with the convolutional filter F12-21 by using nine element data pieces of the channel Ch1-2 and nine weight data pieces of the convolutional filter F12-21 retained in the register. The data convolved for the channel Ch1-2 and the data convolved for the channel Ch1-1 are added and retained in the register 61c.

Hereinafter, similarly, the convolutional computation is performed while switching the channel of the previous layer one by one. In this case, the convolutional filter is switched each time when the channel of the previous layer to be a convolutional computation target is switched, and in order to switch the convolutional filter, the memory block MB that is turned on or off by the second storage circuit 62 is switched.

In a case where the convolutional computation of the final channel (in FIG. 12, a channel Ch1-64) of the previous layer is completed, the element data of the channel Ch2-1 is retained in the register 61c of each of the sum-of-product computation circuits 61. As described above, 64 element data pieces of the channel Ch2-1 are calculated in parallel, and each of the calculated element data pieces is written in the first storage circuit 21.

In a case where there is an uncalculated element data for the channel Ch2-1, that is, in a case where there is an unselected small region in each of the channels of the previous layer, the element data of the channel Ch2-1 is calculated in parallel by the same procedure as described above until there is no unselected small region.

As described above, all the element data of the channel Ch2-1 is calculated, and is written in the first storage circuit 21, and then, a channel Ch2-2 is generated by the same procedure. In the case of generating the channel Ch2-2, the PG switches 63a corresponding to each of the memory blocks MB retaining each weight data piece of a convolutional filter corresponding to a combination between the channel Ch2-2 and the channel of the previous layer to be a convolutional computation target are turned on, and the other PG switches 63a are turned off. Nine weight data pieces are read out from each of the memory blocks MB corresponding to the PG switches 63a that are turned on, and are set in each of the sum-of-product computation circuits 61. As described above, by performing the convolutional computation using the convolutional filter corresponding to the combination between the channel Ch2-2 and the channel of the previous layer to be a convolutional computation target, the channel Ch2-2 is generated. Hereinafter, up to the final channel (in FIG. 12, a channel Ch2-64) of the next layer is generated by the same procedure.

As described above, in a case where each of the channels of the next layer is generated by the pixel parallel, each of the sum-of-product computation circuits 61 performs the convolutional computation by using one convolutional filter in common. Accordingly, in the second storage circuit 62, power can be supplied only to the memory block MB retaining the weight data of the one convolutional filter, and the power supply to the memory block MB retaining weight data of the other convolutional filters can be blocked. Accordingly, the power gating of effectively reducing the power consumption is performed with respect to the second storage circuit 62.

By performing the processing as described above, in a case where the second storage circuit 62 has a storage size in which the weight data of all of the convolutional filters required for generating at least one channel can be retained, the retained data of the second storage circuit 62 is not rewritten to the weight data read out from the first storage circuit 21 while one channel is generated, but the weight data is rewritten only when the channel of the next layer to be generated is switched. Accordingly, the number of accesses of the first storage circuit 21 and the second storage circuit 62 is reduced, which is advantageous to reduce the power consumption and improve a processing speed. In particular, it is advantageous in a configuration in which the second storage circuit 62 has low capacity with respect to the number of weight data.

In a mode (channel parallel described below) of calculating one element data piece for each of the plurality of channels of the next layer in parallel, the convolutional computation is performed by simultaneously using a plurality of convolutional filters corresponding to the plurality of channels of the next layer and one channel of the previous layer. Accordingly, in a case where the number of channels of the next layer increases, and the second storage circuit 62 does not have a storage size in which the weight data of all of the convolutional filters used for generating the next layer can be retained, rewriting occurs.

For example, data is rewritten such that the convolutional filters with the same number as that of sum-of-product computation circuits 61 are set to one set, the weight data of the convolutional filter of one set retained in the second storage circuit 62 is rewritten to the weight data of the convolutional filter of another set read out from the first storage circuit 21, and then, the weight data of the convolutional filter of one set before the rewriting is read out from the first storage circuit 21 and written in the second storage circuit 62. However, in the computation processing device 50 of this example, as described above, by performing the convolutional computation processing with the pixel parallel, in a case where the second storage circuit 62 has a storage size in which the weight data of all of the convolutional filters required for generating at least one channel can be retained, such rewriting does not occur.

As seen from the above description, the number of element data that is calculated by the computation circuit unit 56 in parallel is the same as the number of sum-of-product computation circuits 61 provided in the computation circuit unit 56. Therefore, it is preferable that the number of sum-of-product computation circuits 61 provided in the computation circuit unit 56 is a divisor of the number of element data of the channel of the next layer. Accordingly, it is possible to eliminate the sum-of-product computation circuit 61 that is paused, and to effectively use the resource.

In a case where the maximum value pooling processing or the average value pooling processing of the pooling unit 13 is performed with respect to the layer (the next layer) generated by the convolutional computation processing, it is preferable that the size of each of the channels of the layer, that is, the number of rows and the number of columns are a multiple of 2. As described above, it is possible to efficiently apply the maximum value pooling processing or the average value pooling processing to each of non-overlapping regions of 2 rows and 2 columns. In a case where p and q are each an integer of 1 or more, and the pooling unit 13 performs the pooling processing with respect to a region of p rows and q columns, it is preferable that the number of rows of each of the channels of the layer generated by the convolutional computation processing is a multiple of the value p, and the number of columns is a multiple of q. Next, the same applies to the size of each of the channels of the layer generated by the convolutional computation processing in the case of performing the pooling processing, in other embodiments.

Table 1 shows an example of the number of times of reading out the weight data from the first storage circuit 21 and the availability of the power gating of the second storage circuit 62 in the case of performing the convolutional computation processing with the pixel parallel as described above and in the case of performing the convolutional computation processing with the channel parallel, by using the computation circuit unit 56.

TABLE 1

| Layer | Number of filters (number of output channels) | Number of input channels | Filter size | Output data size | Number of weight data | Pixel parallel | | Channel parallel | |
|---|---|---|---|---|---|---|---|---|---|
| | | | | | | Number of times of reading out weight data | Gating availability | Number of times of reading out weight data | Gating availability |
| 1  | 16    | 3     | 3 × 3 | 416 × 416 | 432       | 432        | Available (63/64)   | 432           | Available (3/4) |
| 2  | 32    | 16    | 3 × 3 | 208 × 208 | 4,608     | 4,608      | Available (63/64)   | 99,680,256    | Available (1/2) |
| 3  | 64    | 32    | 3 × 3 | 104 × 104 | 18,432    | 18,432     | Available (63/64)   | 199,360,512   | Unavailable |
| 4  | 128   | 64    | 3 × 3 | 52 × 52   | 73,728    | 73,728     | Available (63/64)   | 199,360,512   | Unavailable |
| 5  | 256   | 128   | 3 × 3 | 26 × 26   | 294,912   | 4,718,592  | Available (63/64)   | 199,360,512   | Unavailable |
| 6  | 512   | 256   | 3 × 3 | 13 × 13   | 1,179,648 | 4,718,592  | Available (63/64)   | 199,360,512   | Unavailable |
| 7  | 1,024 | 512   | 3 × 3 | 13 × 13   | 4,718,592 | 18,874,368 | Available (63/64)   | 797,442,048   | Unavailable |
| 8  | 256   | 1,024 | 1 × 1 | 13 × 13   | 262,144   | 1,048,576  | Available (575/576) | 44,302,336    | Unavailable |
| 9  | 512   | 256   | 3 × 3 | 13 × 13   | 1,179,648 | 4,718,592  | Available (63/64)   | 199,360,512   | Unavailable |
| 10 | 255   | 512   | 1 × 1 | 13 × 13   | 130,560   | 522,240    | Available (575/576) | 22,064,640    | Unavailable |
| 11 | 128   | 256   | 1 × 1 | 13 × 13   | 32,768    | 131,072    | Available (575/576) | 5,537,792     | Unavailable |
| 12 | 256   | 384   | 3 × 3 | 26 × 26   | 884,736   | 14,155,776 | Available (63/64)   | 598,081,536   | Unavailable |
| 13 | 255   | 256   | 1 × 1 | 26 × 26   | 65,280    | 1,044,480  | Available (575/576) | 44,129,280    | Unavailable |
|    |       |       |       |           | 8,845,488 | 50,029,488 |                     | 2,608,040,880 | |

In Table 1, "Layer" is the number of the layer to be the previous layer. "Number of filters" is the number of convolutional filters used in the convolutional computation when the next layer is generated. In the example of Table 1, the convolutional filter corresponding to the generated channel is used regardless of the channel of the previous layer, and thus, the number of convolutional filters shown in the section of "Number of filters" is the same as the number of channels (the number of output channels) of the generated next layer. "Output data size" indicates the number of element data in the row direction and the column direction of the generated channel. For example, in a case where the output data size is 416×416, each of the generated channels is 416 row and 416 columns. "Number of weight data" is the total number of weight data.

"Number of times of reading out weight data" is the number of times of reading out the weight data from the first storage circuit 21. "Gating availability" indicates whether the power supply can be blocked in the second storage circuit 62. In parentheses of the section of "Gating availability", a ratio of the memory blocks MB in which the power gating is available (the power supply can be blocked) to all of the memory blocks MB of the second storage circuit 62 is shown. In the example of Table 1, the second storage circuit 62 including 576 memory blocks MB is used, and for example, "(63/64)" indicates that the power supply to 567 memory blocks MB in 576 memory blocks MB can be blocked.

Figure 13:
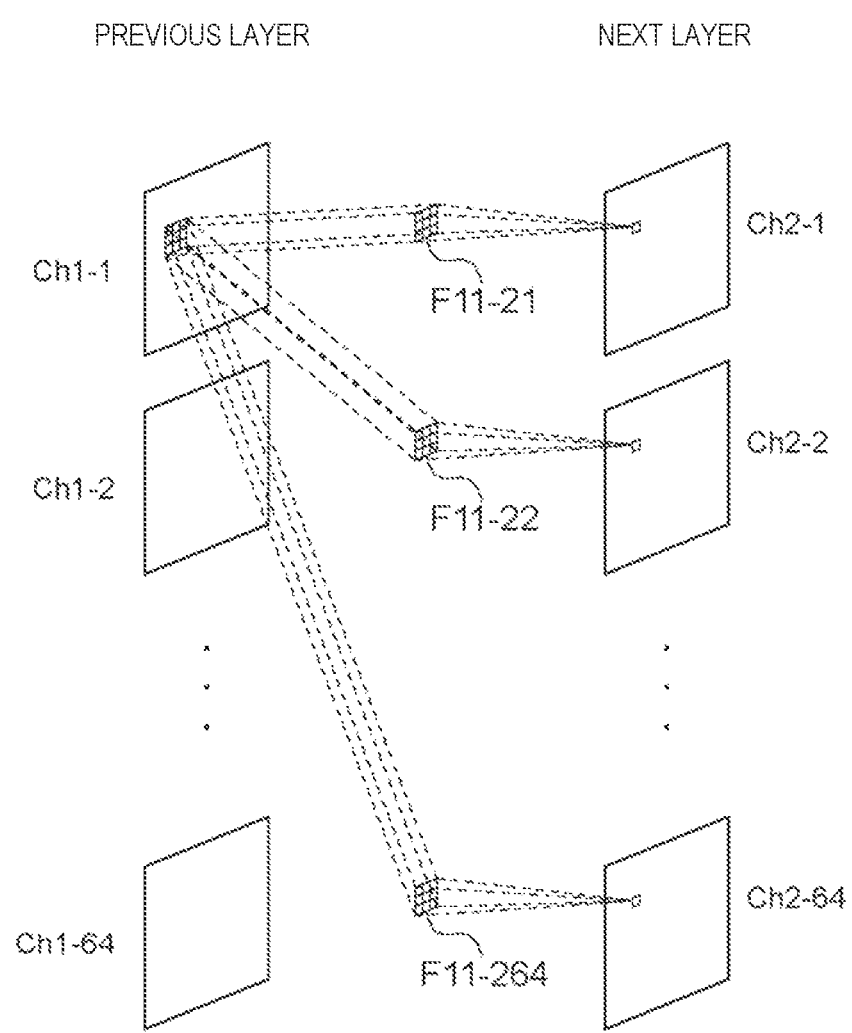
FIG. 13 is an explanatory diagram illustrating a state of channel-parallel convolutional computation processing.

As illustrated in FIG. 13, the channel parallel is the mode of calculating one element data piece for each of the plurality of channels of the next layer in parallel. Therefore, in the case of performing the convolutional computation processing with the channel parallel, the element data of one small region is read out from one channel (for example, the channel Ch1-1) of the previous layer, and the element data is input to each of the sum-of-product computation circuits, and the weight data of different convolutional filters (for example, F11-21 to F11 to 264) set in accordance with the combination between the channel of the previous layer and each of the channels of the next layer is input to each of the sum-of-product computation circuits to perform the convolutional computation. The channel from which the element data is read out is switched for each convolutional computation piece.

As seen from Table 1, in the computation processing device 50 in which the pixel parallel is adopted, even in a case where the total number of weight data of the convolutional filter used in the convolutional computation increases, the read weight data is only for one convolutional filter, and thus, it is possible to perform the power gating. On the other hand, in the channel parallel, in a case where the total number of weight data increases, it is not possible to perform the power gating. It is found that the number of times of reading out the weight data from the first storage circuit 21 to the second storage circuit 62 can be significantly reduced (in the example of Table 1, reduced to approximately ⅕) in the pixel parallel, compared to the channel parallel.

In the example described above, the next channel is generated each time when the generation of one channel of the next layer is completed, but the element data with the same number as that of sum-of-product computation circuits 61 may be calculated in parallel for the next channel of the next layer each time when the element data with the same number as that of sum-of-product computation circuits 61 of one channel of the next layer is calculated in parallel. In this case, the element data with the same number as that of sum-of-product computation circuits 61 is calculated in parallel for the final channel of the next layer, and then, the element data is calculated in the procedure described above by changing the position of each of the small regions in the channel of the previous layer, and the calculation is repeated until there is no unselected small region to generate all of the channels of the next layer.

Third Embodiment

In a third embodiment, the sequence of the convolutional computation processing is switched between the lower layer on the input layer side and the upper layer in which the processing has progressed. As described below in detail, a computation processing device of the third embodiment is the same as the computation processing device 50 of the second embodiment illustrated in FIG. 9, except that the sequence of the convolutional computation processing is switched. Accordingly, the same reference numerals will be applied to substantially the same constituents as those in the second embodiment, and the detailed description thereof will be omitted.

In the third embodiment, the computation processing device 50 switches the sequence of the convolutional computation processing between the upper layer in which the processing has progressed and the lower layer on the input layer side by the controller 58 as a priority control unit. The computation processing device 50 includes a first mode and a second mode in which the sequence of the convolutional computation processing is different, and the controller 58 controls each unit in accordance with the sequence in each of the modes. Both of the first mode and the second mode are the convolutional computation processing of the pixel parallel, but have different types of data preferentially retained in the second storage circuit 62, and different orders of calculating the element data, and the like.

The convolutional computation processing of the first mode is a mode advantageous in a case where the size of the channel is large, the number of channels is small, and the total number of weight data of each of the convolutional filters used in the convolutional computation processing of the target layer is less than the total number of element data of each of the channels of the previous layer. The convolutional processing unit 52 performs the convolutional computation processing of the first mode with respect to the lower layer on the input layer side.

In the first mode, the second storage circuit 62 retains the weight data of each of the convolutional filters used in the convolutional computation processing of the target layer prior to the element data, and retains a predetermined number of element data of the previous layer. Therefore, in the second storage circuit 62, the storage region is adjusted to retain more weight data than the element data.

In the first mode, the computation circuit unit 56 performs the convolutional computation by using the weight data and the element data read out from the second storage circuit 62. In a case where there is more element data of the previous layer, compared to the size of the storage region ensured in the second storage circuit 62, the used element data stored in the second storage circuit 62 is updated to another element data read out from the first storage circuit 21 in accordance with the computation progress status or the like. In a case where there is more weight data used in the convolutional computation processing of the target layer, compared to the size of the storage region ensured in the second storage circuit 62, as with the element data, the weight data retained in the second storage circuit 62 is updated, but in the lower layer, the total number of weight data is comparatively small, and thus, such update is less likely to occur.

In the first mode, the channel for calculating the element data is switched each time when the element data with the same number as that of sum-of-product computation circuits 61 of the computation circuit unit 56 is calculated for one channel. In such a first mode, as illustrated in FIG. 14(A), the weight data of a convolutional filter Fa1-b1 corresponding to a combination between the first channel Cha-1 of the previous layer and the first channel Chb-1 of the next layer is set in each of the sum-of-product computation circuits 61, and then, the element data of the small regions with the same number as that of sum-of-product computation circuits 61 is input to the corresponding sum-of-product computation circuit 61.

Subsequently, the weight data of a convolutional filter Fa2-b1 corresponding to a combination between the second channel Cha-2 of the previous layer and the first channel Chb-1 of the next layer is set in each of the sum-of-product computation circuits 61, and then, the element data of the small regions with the same number as that of sum-of-product computation circuits 61 is input to the corresponding sum-of-product computation circuit 61. Hereinafter, similarly, by changing the channel of the previous layer while switching the convolutional filter, the element data of the small regions with the same number as that of sum-of-product computation circuits 61 is sequentially input to the corresponding sum-of-product computation circuit 61 for each of the channels. Accordingly, the element data with the same number as that of sum-of-product computation circuits 61, for example, 64 element data pieces are calculated in parallel for the first channel Chb-1 of the next layer.

Figure 14:
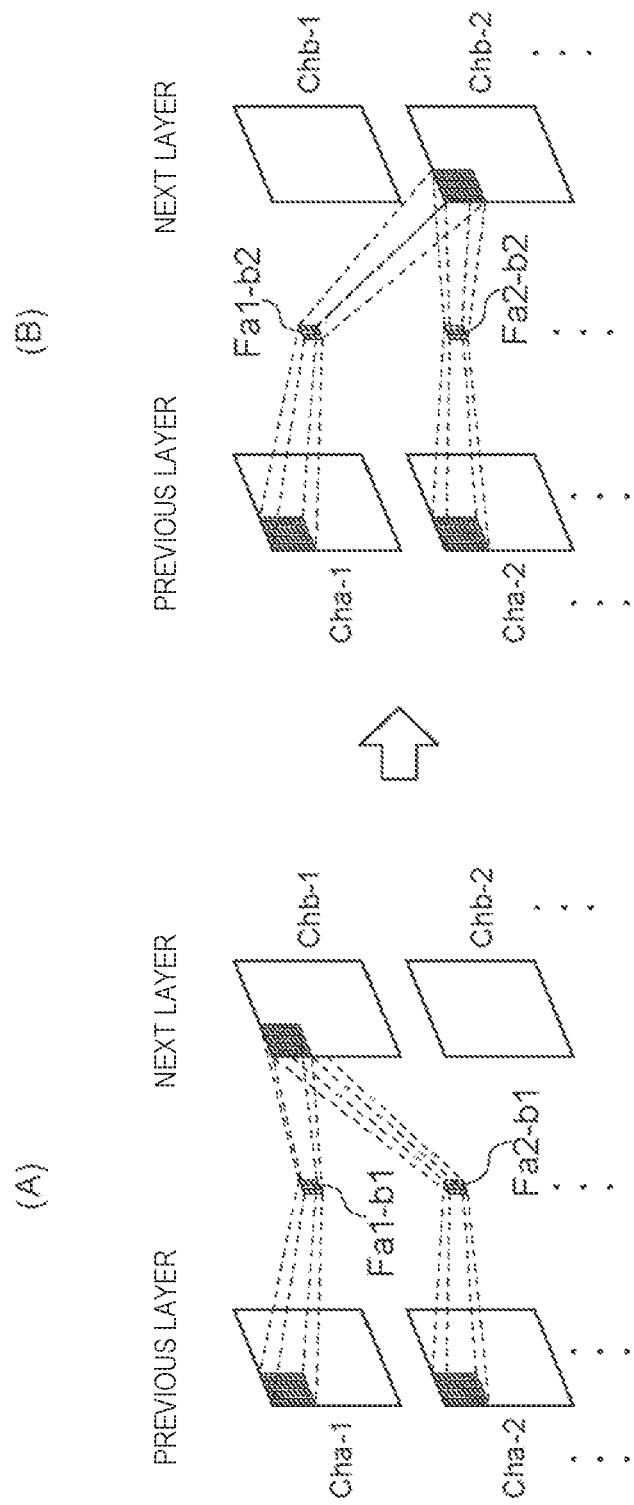
FIG. 14 is an explanatory diagram illustrating a state of convolutional computation processing in a first mode of a third embodiment.

After that, as illustrated in FIG. 14(B), the element data of the second channel Chb-2 of the next layer is calculated. First, the weight data of a convolutional filter Fa1-b2 corresponding to a combination between the first channel Cha-1 of the previous layer and the second channel Chb-2 of the next layer is set in each of the sum-of-product computation circuits 61, and then, the element data of the small regions with the same number as that of sum-of-product computation circuits 61 is input to the corresponding sum-of-product computation circuit 61. Subsequently, the weight data of a convolutional filter Fa2-b2 corresponding to a combination between the second channel Cha-2 of the previous layer and the second channel Chb-2 of the next layer is set in each of the sum-of-product computation circuits 61, and the element data of the small regions with the same number as that of sum-of-product computation circuits 61 is input to the corresponding sum-of-product computation circuit 61. Hereinafter, similarly, by changing the channel of the previous layer while switching the convolutional filter, the element data of the small regions with the same number as that of sum-of-product computation circuits 61 is sequentially input to the corresponding sum-of-product computation circuit 61 for each of the channels. Accordingly, 64 element data pieces are calculated in parallel for the second channel Chb-2 of the next layer.

By repeating the same procedure as described above, 64 element data pieces are calculated for each of the channels up to the final channel of the next layer.

After 64 element data pieces of the final channel of the next layer are calculated, the procedure described above is repeated by changing the position of the plurality of small regions in the channel of the previous layer to calculate all the element data for all of the channels of the next layer.

As described above, in the first mode, the position of the calculated element data is changed each time when the element data with a number according to each of the sum-of-product computation circuits 61 is calculated for all of the channels of the next layer, and all the element data is finally calculated for all of the channels of the next layer.

On the other hand, the convolutional computation processing of the second mode is a mode advantageous in a case where the size of the channel is small, the number of channels is large, and the total number of weight data of each of the convolutional filters used in the convolutional computation processing is more than the total number of element data of the previous layer used in the convolutional computation processing of the target layer. The convolutional processing unit 52 performs the convolutional computation processing of the second mode with respect to the upper layer.

In the second mode, the second storage circuit 62 retains the element data of the previous layer used in the convolutional computation processing of the target layer prior to the weight data of the convolutional filter, and retains a predetermined number of weight data of the convolutional filter used in the convolutional computation processing of the target layer. Therefore, in the second storage circuit 62, the storage region is adjusted to retain more element data than the weight data.

In the second mode, the computation circuit unit 56 also performs the convolutional computation by using the weight data and the element data read out from the second storage circuit 62. The second mode is the same as the first mode in that in a case where there is more element data of the previous layer and more weight data, compared to the size of the storage region ensured in the second storage circuit 62, the element data and the weight data are updated to data read out from the first storage circuit 21. In the upper layer, the total number of element data is comparatively small, and thus, such update is less likely to occur.

Figure 15:
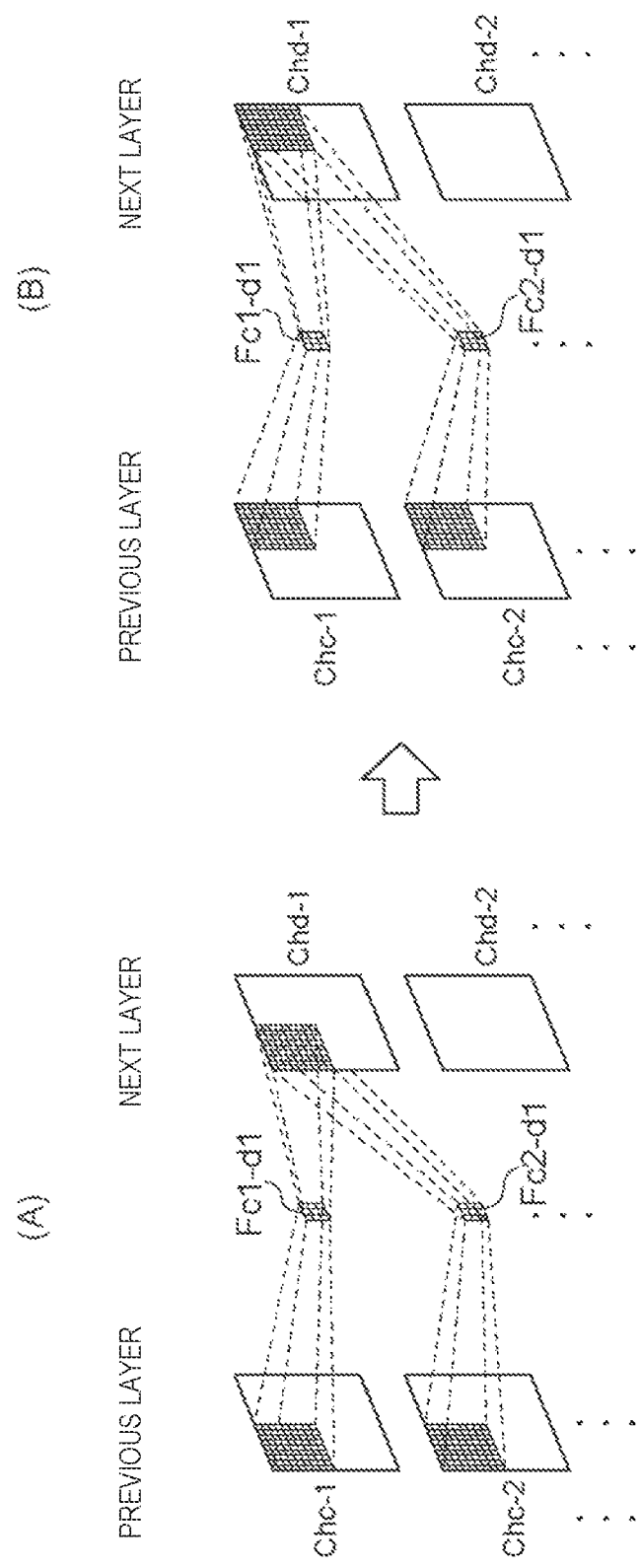
FIG. 15 is an explanatory diagram illustrating a state of the convolutional computation processing in a second mode of the third embodiment.

The second mode is different from the first mode in that the next channel is generated each time when the generation of one channel is completed by the pixel parallel. In the second mode, as illustrated in FIG. 15(A), the weight data of a convolutional filter Fc1-d1 corresponding to a combination between the first channel Chc-1 of the previous layer and the first channel Chd-1 of the next layer is set in each of the sum-of-product computation circuits 61, and then, the element data of the small regions with the same number as that of sum-of-product computation circuits 61 is input to each of the corresponding sum-of-product computation circuits 61. Subsequently, the weight data of a convolutional filter Fc2-d1 corresponding to a combination between the second channel Chc-2 of the previous layer and the first channel Chd-1 of the next layer is set in each of the sum-of-product computation circuits 61, and then, the element data of the small regions with the same number as that of sum-of-product computation circuits 61 is input to each of the corresponding sum-of-product computation circuits 61. Hereinafter, similarly, by changing the channel of the previous layer while switching the convolutional filter, the element data of the small regions with the same number as that of sum-of-product computation circuits 61 is sequentially input to the corresponding sum-of-product computation circuit 61 for each of the channels. Accordingly, the element data with the same number as that of sum-of-product computation circuits 61 is calculated in parallel for the first channel Chd-1 of the next layer. Therefore, such an initial calculation operation is the same as that in the first mode.

After that, as illustrated in FIG. 15(B), each of the small regions in the channel of the previous layer is changed to be different from the previous small region. The weight data of the convolutional filter Fc1-d1 corresponding to the combination between the first channel Chc-1 of the previous layer and the first channel Chd-1 of the next layer is set in each of the sum-of-product computation circuits 61, and then, the element data of each of the small regions at the position different from the previous position is input to each of the corresponding sum-of-product computation circuits 61. Subsequently, the weight data of the convolutional filter Fc2-d1 corresponding to the combination between the second channel Chc-2 of the previous layer and the first channel Chd-1 of the next layer is set in each of the sum-of-product computation circuits 61, and then, the element data of each of the small regions is input to each of the corresponding sum-of-product computation circuits 61. Hereinafter, similarly, by changing the channel of the previous layer while switching the convolutional filter, the element data of each of the small regions is sequentially input to the corresponding sum-of-product computation circuit 61 for each of the channels of the previous layer, and the element data with the same number as that of sum-of-product computation circuits 61 is further calculated in parallel for first channel Chd-1 of the next layer. By repeating the procedure described above, all the element data of the first channel Chd-1 of the next layer is calculated.

As described above, after the generation of the first channel Chd-1 of the next layer is completed, each of the element data pieces of the second channel Chd-2 of the next layer is calculated by the same procedure. In this case, the weight data of a convolutional filter corresponding to a combination between each of the channels of the previous layer to be a convolutional computation target and the channel Chd-2 of the next layer to be generated is set in each of the sum-of-product computation circuits 61. After the generation of each of the channels of the second channel Chd-2 of the next layer is completed, similarly, each of the third and subsequent channels of the next layer is generated.

The controller 58 sets the first mode in the convolutional computation processing in which the previous layer is before a predetermined switching layer, and sets the second mode in the convolutional computation processing in which the previous layer is after the switching layer. The switching layer for switching the first mode and the second mode may be a layer in which when the convolutional computation processing is repeatedly performed, the total number of element data used in the convolutional computation processing of one layer is first larger than the total number of weight data used in the convolutional computation processing for generating the one layer.

In both of the first mode and the second mode, when the convolutional computation is performed, the power gating is performed such that the power supply to the memory block MB of the second storage circuit 62 retaining data that is not used in the convolutional computation is blocked. Power supply not only to the memory block MB retaining the weight data that is not used in the convolutional computation but also to the memory block MB retaining the element data that is not used in the convolutional computation is blocked. Accordingly, the power consumption of the computation processing device 50 is reduced.

As described above, in the lower layer, the convolutional computation processing is performed in the first mode, and in the upper layer, the convolutional computation processing is performed in the second mode, to switch the data preferentially retained in the second storage circuit 62, and thus, repeated reading from the second storage circuit 62 increases, reading from the first storage circuit 21 to the second storage circuit 62 is effectively reduced, and the convolutional computation processing is efficiently performed. A delay due to the simultaneous reading of the weight data and the element data from the first storage circuit 21 is avoided.

In the example described above, in both of the lower layer and the upper layer, the convolutional computation processing is performed with the pixel parallel, but it is preferable to perform the convolutional computation processing of the first mode in the lower layer with the channel parallel. In this case, in the first mode, as with the first mode of the pixel parallel, the second storage circuit 62 retains the weight data of each of the convolutional filters used in the convolutional computation processing of the target layer prior to the element data, and retains a predetermined number of element data of the previous layer.

Figure 16:
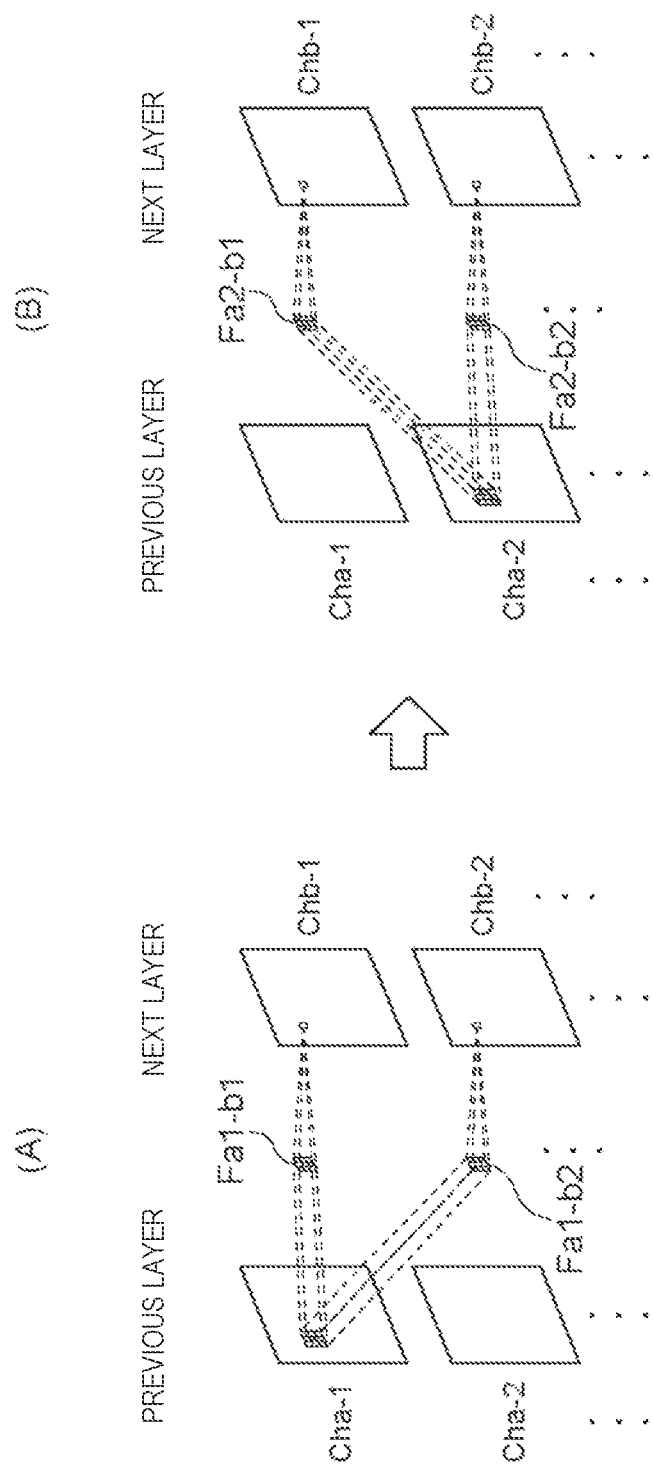
FIG. 16 is an explanatory diagram illustrating a state of channel-parallel convolutional computation processing in a first mode.

In the first mode of the channel parallel, first, as illustrated in FIG. 16(A), the weight data of the convolutional filters Fa1-b1, Fa1-b2, ... corresponding to the first channel Cha-1 of the previous layer and the first channel to the 64th channel of the next layer is set in the sum-of-product computation circuit 61 such that the weight data of one convolutional filter is set in one sum-of-product computation circuit 61. After that, each of the element data pieces of one small region in the first channel Cha-1 of the previous layer is input to each of the sum-of-product computation circuits 61, and each one data piece is calculated for each of the first channel to the 64th channel of the next layer, and is retained in the register 61c.

Next, as illustrated in FIG. 16(B), each of the convolutional filters Fa2-b1, Fa2-b2, . . . corresponding to the second channel Cha-2 of the previous layer and the first channel to the 64th channel of the next layer is set in each of the sum-of-product computation circuits 61. After such setting, each of the element data pieces of the small region at the same position as that of the first channel Cha-1 in the second channel Cha-2 of the previous layer is input to each of the sum-of-product computation circuits 61, and each one data piece is calculated for each of the first channel to the 64th channel of the next layer. The calculated data and the data retained in each of the registers 61c are added with the corresponding data pieces by the adder 61b, and are retained in each of the registers 61c as new data.

Hereinafter, similarly, while changing the convolutional filter set in each of the sum-of-product computation circuits 61, each one convolved data piece is calculated for each of the first channel to the 64th channel of the next layer from each of the element data pieces of one small region for each of the remaining channels of the previous layer. The calculated data and the data retained in the register 61c are added with the corresponding data pieces. As described above, one element data piece is calculated in parallel for each of the first channel to the 64th channel of the next layer.

As described above, after one element data piece is calculated for each of the first channel to the 64th channel of the next layer, by repeating the same procedure as described above while changing the position of the small region in each of the channels of the previous layer, all the element data is calculated for each of the 65th and subsequent channels of the next layer.

Even in the case of using the first mode of the channel parallel, when performing the convolutional computation, the power gating is performed such that the power supply to the memory block MB retaining the data that is not used in the convolutional computation is blocked. Accordingly, the power consumption of the computation processing device 50 is reduced.

In the switch between the first mode of the channel parallel and the second mode of the pixel parallel, when the convolutional processing is repeatedly performed, the second mode of the pixel parallel may be switched from the processing in which the number of channels of the next layer is first larger than the number of sum-of-product computation circuits 61. This is because in a case where the number of channels of the next layer is equal to or less than the number of sum-of-product computation circuits 61 in the channel parallel, the number of times of reading out the element data from the first storage circuit 21 to the second storage circuit 62 is only one by the channel parallel, and thus, the number of accesses to the first storage circuit 21 can be reduced.

As shown an example in Table 2, in a case where the convolutional computation processing is repeatedly performed, when the number of sum-of-product computation circuits 61 is 128, the first mode of the channel parallel may be set until the convolutional computation processing of calculating the fourth layer as the next layer, and the second mode of the pixel parallel may be set from the convolutional computation processing of calculating the fifth layer as the next layer.

TABLE 2

| Weight data | | | | | |
|---|---|---|---|---|---|
| Layer | Number of filters (number of output channels) | Number of input channels | Filter size | Output data size | Number of times of reading out weight data |
| 1 | 16 | 3 | 3 × 3 | 416 × 416 | 432 |
| 2 | 32 | 16 | 3 × 3 | 208 × 208 | 4,608 |
| 3 | 64 | 32 | 3 × 3 | 104 × 104 | 18,432 |
| 4 | 128 | 64 | 3 × 3 | 52 × 52 | 73,728 |
| 5 | 256 | 128 | 3 × 3 | 26 × 26 | 294,912 |
| 6 | 512 | 256 | 3 × 3 | 13 × 13 | 1,179,648 |
| 7 | 1,024 | 512 | 3 × 3 | 13 × 13 | 4,718,592 |
| 8 | 256 | 1,024 | 1 × 1 | 13 × 13 | 262,144 |
| 9 | 512 | 256 | 3 × 3 | 13 × 13 | 1,179,648 |
| 10 | 255 | 512 | 1 × 1 | 13 × 13 | 130,560 |
| 11 | 128 | 256 | 1 × 1 | 13 × 13 | 32,768 |
| 12 | 256 | 384 | 3 × 3 | 26 × 26 | 884,736 |
| 13 | 255 | 256 | 1 × 1 | 26 × 26 | 65,280 |
| | | | | | 8,845,488 |

| Element data | | | | | |
|---|---|---|---|---|---|
| Layer | Number of filters (number of output channels) | Input data size | Filter size | Number of input channels | Number of times of reading out element Data |
| 1 | 16 | 416 × 416 | 3 × 3 | 3 | 519,168 |
| 2 | 32 | 208 × 208 | 3 × 3 | 16 | 692,224 |
| 3 | 64 | 104 × 104 | 3 × 3 | 32 | 346,112 |
| 4 | 128 | 52 × 52 | 3 × 3 | 64 | 173,056 |
| 5 | 256 | 26 × 26 | 3 × 3 | 128 | 86,528 |
| 6 | 512 | 13 × 13 | 3 × 3 | 256 | 43,264 |
| 7 | 1,024 | 13 × 13 | 3 × 3 | 512 | 86,528 |
| 8 | 256 | 13 × 13 | 1 × 1 | 1,024 | 173,056 |
| 9 | 512 | 13 × 13 | 3 × 3 | 256 | 43,264 |
| 10 | 255 | 13 × 13 | 1 × 1 | 512 | 86,528 |

TABLE 2-continued

| 11 | 128 | 13 × 13 | 1 × 1 | 256 | 43,264 |
|----|-----|---------|-------|-----|--------|
| 12 | 256 | 26 × 26 | 3 × 3 | 384 | 259,584 |
| 13 | 255 | 26 × 26 | 1 × 1 | 256 | 173,056 |
| | | | | | 2,725,632 |

REFERENCE SIGN LIST 10, 50: Computation processing device
13: Pooling unit
15: Memory unit
16, 56: Computation circuit unit
17, 57: Power gate control unit
18, 58: Controller
21: First Storage circuit
22, 62: Second storage circuit
24, 61: Sum-of-product computation circuit
31: Memory cell
39: Sum-of-product computation unit

The invention claimed is:

1. A computation processing device, comprising:
a memory unit that retains computation data for weighting computation, and at least a part of which is a non-volatile storage region;
a computation circuit unit that performs computation processing including the weighting computation by using a part or all of the computation data input from the memory unit;
a power gate unit that blocks power supply to a part or all of memory cells other than memory cells storing a part or all of the computation data input to the computation circuit unit in the computation processing when performing the computation processing, in the non-volatile storage region;
a data length setting unit that sets an effective data length with respect to the computation data set in advance, for each computation processing piece of the computation circuit unit,
wherein the computation circuit unit performs the computation processing to a portion of the computation data of the set effective data length,
the power gate unit blocks power supply to memory cells storing a data portion other than the effective data length of the computation data among each of the memory cells in the non-volatile storage region, as memory cells other than memory cells storing a part of the computation data,
the memory unit retains weight data to be a weight of the weighting computation and element data to be weighted, as the computation data,
the computation circuit unit includes a sum-of-product computation circuit including a multiplier performing multiplication of the weight data and the element data, a register, and an adder retaining an addition result obtained by adding a multiplication result by the multiplier and data retained in the register, and
the power gate unit blocks power supply to unused bit cells in the register, on the basis of the effective data length.

2. The computation processing device according to claim 1,
wherein the memory unit stores each of the element data of a channel of a previous layer in a convolutional neural network and the weight data that is a weight of a convolutional filter, as the element data, and
the sum-of-product computation circuit performs convolutional computation processing by using the element data of the previous layer and the weight data to calculate element data of a channel of a next layer.

3. The computation processing device according to claim 2,
wherein the data length setting unit sets the effective data length set in advance for each convolutional computation processing piece of each layer of the convolutional neural network.

4. The computation processing device according to claim 1,
wherein the memory unit includes a first storage circuit, and a second storage circuit that is provided as the non-volatile storage region and is provided physically closer to the computation circuit unit than the first storage circuit or has a higher access speed than that of the first storage circuit.

5. The computation processing device according to claim 1,
wherein the memory cell of the non-volatile storage region includes MRAM.

6. A computation processing device, comprising:
a memory unit that retains computation data for weighting computation, and at least a part of which is a non-volatile storage region;
a computation circuit unit that performs computation processing including the weighting computation by using a part or all of the computation data input from the memory unit;
a power gate unit that blocks power supply to a part or all of memory cells other than memory cells storing a part or all of the computation data input to the computation circuit unit in the computation processing when performing the computation processing, in the non-volatile storage region; and
a data length setting unit that sets an effective data length with respect to the computation data set in advance, for each computation processing piece of the computation circuit unit,
wherein the computation circuit unit performs the computation processing to a portion of the computation data of the set effective data length,
the power gate unit blocks power supply to memory cells storing a data portion other than the effective data length of the computation data among each of the memory cells in the non-volatile storage region, as memory cells other than memory cells storing a part of the computation data, and
the data length setting unit sets the effective data length according to an operation mode.

7. A computation processing device, comprising:
a memory unit that retains computation data for weighting computation, and at least a part of which is a non-volatile storage region;

a computation circuit unit that performs computation processing including the weighting computation by using a part or all of the computation data input from the memory unit;

a power gate unit that blocks power supply to a part or all of memory cells other than memory cells storing a part or all of the computation data input to the computation circuit unit in the computation processing when performing the computation processing, in the non-volatile storage region; and a data length setting unit that sets an effective data length with respect to the computation data set in advance, for each computation processing piece of the computation circuit unit, wherein the computation circuit unit performs the computation processing to a portion of the computation data of the set effective data length, the power gate unit blocks power supply to memory cells storing a data portion other than the effective data length of the computation data among each of the memory cells in the non-volatile storage region, as memory cells other than memory cells storing a part of the computation data, and the computation circuit unit includes a plurality of sum-of-product computation units each using data with a bit number shorter than a maximum value of the effective data length of data according to the computation processing, as a computation target, and performs the computation processing by combining a part or all of the plurality of sum-of-product computation units, in accordance with the set effective data length.

8. A computation processing device, comprising:

a memory unit that retains computation data for weighting computation, and at least a part of which is a non-volatile storage region;

a computation circuit unit that performs computation processing including the weighting computation by using a part or all of the computation data input from the memory unit; and a power gate unit that blocks power supply to a part or all of memory cells other than memory cells storing a part or all of the computation data input to the computation circuit unit in the computation processing when performing the computation processing, in the non-volatile storage region, wherein the memory unit retains each of element data of a plurality of channels of a previous layer and weight data of a plurality of convolutional filters, as the computation data, and retains the weight data in the non-volatile storage region, the computation circuit unit includes a plurality of sum-of-product computation circuits that perform convolutional computation of the element data of the channel of the previous layer and calculate the element data of a channel of a next layer in parallel, the weight data of one of the convolutional filters that is selected in accordance with the channel of the previous layer or the channel of the next layer and is read out from the non-volatile storage region is input to the plurality of sum-of-product computation circuits, and the plurality of sum-of-product computation circuits each perform the convolutional computation in parallel by using the input weight data and the element data of one channel of the previous layer to calculate the element data of one channel of the next layer, and in convolutional computation processing of the plurality of sum-of-product computation circuits, the power gate unit blocks power supply to memory cells in the non-volatile storage region retaining the weight data other than the weight data that is input to the plurality of sum-of-product computation circuits in the convolutional computation processing.

9. The computation processing device according to claim 8, wherein the plurality of sum-of-product computation circuits have the same number as a divisor of the number of data of the channel of the next layer.

10. The computation processing device according to claim 8, wherein the computation circuit unit generates the channel of the next layer in which the number of data in each of a row direction and a column direction is a multiple of 2.

11. The computation processing device according to claim 10, further comprising a pooling unit that obtains a maximum value or an average value for each of a plurality of small regions obtained by dividing the channel of the next layer into 2 rows and 2 columns.

12. A computation processing device, comprising:

a memory unit that retains computation data for weighting computation, and at least a part of which is a non-volatile storage region;

a computation circuit unit that performs computation processing including the weighting computation by using a part or all of the computation data input from the memory unit; and a power gate unit that blocks power supply to a part or all of memory cells other than memory cells storing a part or all of the computation data input to the computation circuit unit in the computation processing when performing the computation processing, in the non-volatile storage region, wherein the memory unit retains element data of a channel and weight data of a convolutional filter, as the computation data, the computation circuit unit repeatedly performs convolutional computation processing of generating data of a channel of a next layer by applying the convolutional filter to the element data of a channel of a previous layer, and the computation processing device further comprises a priority control unit that preferentially retains the weight data used in the convolutional computation processing in the non-volatile storage region, in the convolutional computation processing in which the previous layer is before a predetermined switching layer, and preferentially retains the element data of the channel of the previous layer used in the convolutional computation processing in the non-volatile storage region, in the convolutional computation processing in which the previous layer is after the predetermined switching layer.

13. The computation processing device according to claim 12, wherein in the convolutional computation processing in which the previous layer is before the predetermined switching layer, the non-volatile storage region retains all of the weight data used in the convolutional computation processing.

14. The computation processing device according to claim 12, wherein in the convolutional computation processing in which the previous layer is after the predetermined switching layer, the non-volatile storage region retains all of the element data used in the convolutional computation processing.

15. The computation processing device according to claim 14,
wherein the predetermined switching layer is a layer in which when the convolutional computation processing is repeatedly performed, the total number of weight data used in the convolutional computation processing of one layer is first larger than the total number of element data of the previous layer used in the convolutional computation processing of the one layer.

16. The computation processing device according to claim 12,
wherein the computation circuit unit calculates the element data of one channel of the next layer in parallel.

17. The computation processing device according to claim 12,
wherein the computation circuit unit
calculates one of the element data pieces in parallel for each of a plurality of channels of the next layer, in the convolutional computation processing in which the previous layer is before the predetermined switching layer, and
calculates the element data of one channel of the next layer in parallel, in the convolutional computation processing in which the previous layer is after the predetermined switching layer.

18. The computation processing device according to claim 17,
wherein the predetermined switching layer is a layer in which when the convolutional computation processing is repeatedly performed, the number of channels of the next layer is first larger than the number of sum-of-product computation circuits configuring the plurality of sum-of-product computation circuits.

* * * * *